United States Patent
Sera et al.

(10) Patent No.: US 8,753,726 B2
(45) Date of Patent: Jun. 17, 2014

(54) OPTICAL COMPENSATION FILM, POLARIZING PLATE AND LIQUID CRYSTAL DISPLAY

(75) Inventors: Takashi Sera, Tokyo (JP); Takahiro Takagi, Kanagawa (JP)

(73) Assignee: Konica Minolta Opto, Inc., Tokyo (JP)

( * ) Notice: Subject to any disclaimer, the term of this patent is extended or adjusted under 35 U.S.C. 154(b) by 1192 days.

(21) Appl. No.: 12/105,635

(22) Filed: Apr. 18, 2008

(65) Prior Publication Data

US 2008/0268180 A1    Oct. 30, 2008

(30) Foreign Application Priority Data

Apr. 26, 2007   (JP) .................................. 2007-116568
Sep. 11, 2007   (JP) .................................. 2007-235203
Sep. 28, 2007   (JP) .................................. 2007-253737

(51) Int. Cl.
  *C09K 19/00*   (2006.01)
(52) U.S. Cl.
  USPC ........... 428/1.3; 428/1.33; 349/117; 349/118; 349/137; 524/35; 106/169.34
(58) Field of Classification Search
  USPC .................. 428/1.3, 1.33; 349/117–118, 137; 359/599, 601; 524/35; 106/169.34
  See application file for complete search history.

(56) References Cited

U.S. PATENT DOCUMENTS

| | | | | |
|---|---|---|---|---|
| 3,291,625 | A * | 12/1966 | Faraone et al. | 106/18.18 |
| 2002/0102369 | A1 * | 8/2002 | Shimizu et al. | 428/1.33 |
| 2003/0171458 | A1 * | 9/2003 | Buchanan et al. | 524/32 |
| 2006/0057307 | A1 * | 3/2006 | Matsunaga et al. | 428/1.31 |
| 2006/0280882 | A1 * | 12/2006 | Oka et al. | 428/1.31 |
| 2007/0040963 | A1 * | 2/2007 | Maruyama et al. | 349/96 |

FOREIGN PATENT DOCUMENTS

| | | |
|---|---|---|
| JP | 2002-363420 | 12/2002 |
| JP | 2006-117914 | 5/2006 |
| JP | 2007-079534 | 3/2007 |

OTHER PUBLICATIONS

JPO Website Machine English Translation of JP 2002-267844, Ito, Sep. 18, 2002.*
Korean Office Action, Notice of Submission of Opinion, Application No. 10-2009-7022052, Mailing Date: Feb. 28, 2014 (4 pages).
English translation of Korean Office Action, Notice of Submission of Opinion, Application No. 10-2009-7022052, Mailing Date: Feb. 28, 2014 (4 pages).

* cited by examiner

*Primary Examiner* — Gwendolyn Blackwell
*Assistant Examiner* — Ruiyun Zhang
(74) *Attorney, Agent, or Firm* — Lucas & Mercanti, LLP

(57) ABSTRACT

An optical compensation film and a liquid crystal display characterized in that in a scattered-light intensity measurement for a film with an incident light with 90° in a scattered light profile of a goniophotometer, in the case of measuring so as to detect a scattered light intensity at the position of 130° from a light source, a difference in scattered light intensity between the case where a film slow axis is installed horizontally on a sample stand and the case where the film slow axis is installed vertically is 0.05 or less.

8 Claims, 1 Drawing Sheet

OPTICAL COMPENSATION FILM, POLARIZING PLATE AND LIQUID CRYSTAL DISPLAY

TECHNICAL FIELD

The present invention relates to an optical compensation film used for a liquid crystal display, in particular, relates in detail to an optical compensation film which is excellent in visibility (light leakage, color tone unevenness, front contrast), and compatible to both retardation and wavelength dispersion characteristic, and relates to a polarizing plate and a liquid crystal display device employing the optical compensation film.

TECHNICAL BACKGROUND

A cellulose ester film, a polycarbonate film, a poly cyclic olefin film, and so on are widely used as an optical film for liquid crystal displays.

It is required for an optical film that its transparency should be optically high and also its birefringence should be low. Especially, in recent years, the size of a liquid crystal display becomes lager and the luminance becomes higher and higher. In connection with these, an improvement in front contrast is demanded more severely than ever before.

Since the transparency of a cellulose ester film is optically high and also its birefringence is low, it has been mainly used as a protective film (hereinafter, referred to as a polarizing plate protective film) of a polarization film of a liquid crystal display. A polycarbonate film and a poly cyclic olefin film have mainly been used as an optical compensation film for adjusting a retardation.

In order to improve the front contrast, an improvement in transmittance of each member constituting a liquid crystal display has been examined continuously. However, also the improvement in transmittance has been continuously examined about an optical compensation at the cell side of a polarizing plate without exception.

Moreover, in order to control a retardation and its wavelength dispersion characteristic, an optical compensation film has been usually used in combination with plural sheets of optical films.

However, since the combination of the plural sheets of optical films has a large load in productivity in terms of combination precision and an increase in the number of processes, an optical compensation technology with a small number of sheets has been studied.

For example, in Liquid crystal "various functional films for a liquid crystal display element" in the special edition of 9th Volume No. 4 (2005) in the journal of Japanese Liquid Crystal Society, a technology to make it into one sheet with a polycarbonate film and a poly cyclic olefin film has been proposed. However, even if such a technology is used, as an optical compensation film which serves as a polarizing plate protective film, it has an insufficient pasting ability with polyvinyl alcohol being a polarization film, and a polarizing plate protective film consisting of a cellulose ester film has been recognized to be an indispensable optical film in a liquid crystal display even now.

Then, it has been studied to provide a function as an optical compensation film to the cellulose ester film which is excellent as this polarizing plate protective film.

Basically, since a cellulose ester film has the circumstances where it has been used as a polarizing plate protective film due to its low birefringence characteristic, it may be not easy to provide the function.

In order to acquire a desired retardation value, a technique to add a compound having a retardation increasing effect to a cellulose ester film- and to further stretch the film is proposed (Patent Documents 1, 2, 3, 4, 5), but there are problems that the wavelength dispersion characteristic does no stabilize over time and the permeability of the film is deteriorated by the stretching.

If the wavelength dispersion characteristic is insufficient, phenomena such as light leakage from a polarizing plate (especially light leakage with an elapse of time), color tone fluctuation of an image on a liquid crystal display and front contrast deterioration occur.

Therefore, it has been desired eagerly to provide the wavelength dispersion characteristic stable over time and a desired retardation value simultaneously to a cellulose ester film.

The transmittance deterioration of a film is presumed to be an increase in haze (dispersion factor), and the phenomenon of deteriorating the front contrast occurs.

Therefore, it has been desired eagerly to provide a desired retardation value and a decrease of haze simultaneously to a cellulose ester film.

Patent Document 1: Japanese Patent Unexamined Publication No. 200-111914
Patent Document 2: Japanese Patent Unexamined Publication No. 2002-131538
Patent Document 3: Japanese Patent Unexamined Publication No. 2006-299171
Patent Document 4: Japanese Patent Unexamined Publication No. 2006-154803
Patent Document 5: Japanese Patent Unexamined Publication No. 2006-265382
Non Patent document: Japanese Liquid Crystal Society Journal Liquid Crystal "Various functional films for liquid crystal display elements" Special edition Vol. 9 No. 4 (2005)

SUMMARY

An object of the present invention is to provide an optical compensation film which is excellent in visibility (light leakage, color tone unevenness, front contrast) and satisfies both a retardation and wavelength dispersion characteristic. Further, the object of the present invention is to provide a liquid crystal display device in which light leakage is reduced, color tone fluctuation and front contrast are improved by use of a polarizing plate employing the optical compensation film.

The above-mentioned objects of the present invention can be attained by the following structures.

In the first embodiment of the present invention, an optical compensation film is characterized in that in a scattered-light intensity measurement for a film with an incident light with 90° in a scattered light profile of a goniophotometer, in the case of measuring so as to detect a scattered light intensity at the position of 130° from a light source, a difference in scattered light intensity between the case where a film slow axis is installed horizontally on a sample stand and the case where the film slow axis is installed vertically is 0.05 or less.

In the second embodiment of the present invention, an optical compensation film is characterized by containing:
(meth)acrylic polymer; and
an esterified compound in which all or a part of OH groups in a compound (A) are esterified, wherein the compound (A) has one of a furanose structure and a pyranose structure; or
an esterified compound in which all or a part of OH groups in a compound (B) are esterified, wherein in the compound (B), two or more and twelve or less of at least one kind of a furanose structure and a pyranose structure are bonded.

In the first or second embodiment, it is preferable that the optical compensation film satisfies the following formulas (A-1) to (A-3).

$$20 \leq Ro \leq 100 \text{(nm)} \quad \text{(A-1)}$$

$$70 \leq Rt \leq 200 \text{(nm)} \quad \text{(A-2)}$$

$$0.82 \leq Ro(480)/Ro(630) \leq 0.95 \quad \text{(A-3)}$$

Here, $$Ro = (nx - ny) \times d$$

$$Rt = ((nx + ny)/2 - nz) \times d$$

(In these formulas, nx represents a refractive index in a slow axis direction in a plane of the optical compensation film, ny represents a refractive index in a direction perpendicular to the slow axis in a plane, nz represents a refractive index in a thickness direction and d represents the thickness (nm) of the optical compensation film respectively. The measuring wavelength for the refractive index is 590 nm. Ro (480) and Ro (630) represent Ro measured with the wavelength of 480 nm and Ro measured with the wavelength of 630 nm, respectively)

It is preferable that the esterified compound is a benzoate ester of a monosaccharide (α-glucose, β-fructose) or a benzonate ester of a polysaccharide (m+n=2 to 12) produced by dehydration condensation of at least two optional positions of —$OR_{12}$, —$OR_{15}$, —$OR_{22}$, and —$OR_{25}$ of monosaccharides represented by the following Formula (A).

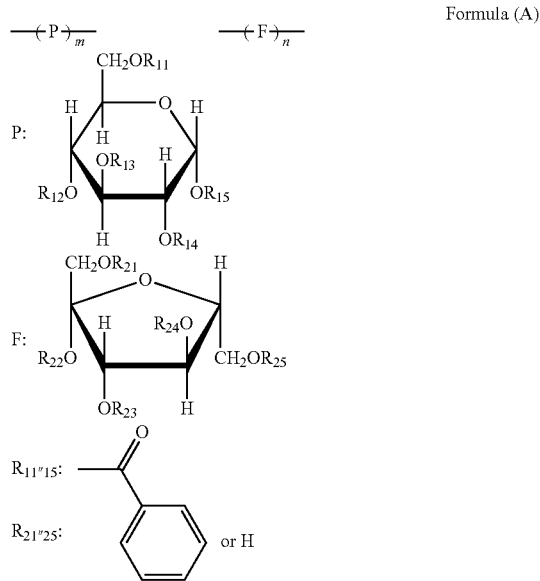

Formula (A)

It is a more preferable embodiment that the above-mentioned (meth)acrylic polymer is a polymer Y which is obtained by a process of polymerizing ethylenic unsaturated monomer Ya not having an aromatic ring and has an average molecular weight of 500 or more and 3,000 or less.

It is also a more preferable embodiment that the above-mentioned (meth)acrylic polymer is:

a polymer X which is obtained by a process of copolymerizing an ethylenic unsaturated monomer Xa not having an aromatic ring and a hydroxyl group at least in a molecule thereof and an ethylenic unsaturated monomer Xb not having an aromatic ring and having a hydroxyl group in a molecule thereof and has an average molecular weight of 3,000 or more and 30,000 or less, and a polymer Y which is obtained by a process of polymerizing an ethylenic unsaturated monomer Ya not having an aromatic ring and has an average molecular weight of 500 or more and 3,000 or less.

It is a more preferable embodiment that the above-mentioned polymer X is represented by Formula (X) and the above-mentioned polymer Y is represented by Formula (Y).

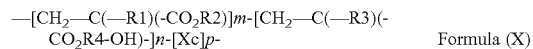

(in these formulas, R1, R3, and R5 represent H or $CH_3$ respectively. R2 is an alkyl group or a cycloalkyl group having a carbon number of 1 to 12. R4 and R6 represent —$CH_2$—, —$C_2H_4$—, or —$C_3H_6$— respectively. Ry represents OH, H, or an alkyl group with a carbon number of 3 or less. Xc represents a monomer unit polymerizable with Xa and Xb. Yb represents a monomer unit copolymerizable with Ya. Each of m, n, k, p, and q represents a mole composition ratio, provided that each of m and k is not 0, m+n+p=100, and k+q=100.

In the third embodiment, a polarizing plate is characterized by employing the above optical compensation film on at least one surface thereof.

In the fourth embodiment, a liquid crystal display is characterized by employing the above polarizing plate on at least one surface of a liquid crystal cell.

With the above structures, it is possible to provide an optical compensation film which can improve the visibility (light leakage, color tone unevenness, front contrast) of a liquid crystal display device and satisfies both a retardation and wavelength dispersion characteristic, and to provide a polarizing plate and a liquid crystal display device employing the optical compensation film.

PREFERRED EMBODIMENT OF THE INVENTION

Although the best modes for carrying out the present invention are explained below in detail, the present invention is not limited to these modes.

As mentioned above, view angle characteristics exists generally in a liquid crystal display, and when the liquid crystal display is observed from a position having an angle from the direction of a normal line of a liquid crystal cell, there is a problem that a contrast falls down.

In order to solve this problem, it has been known that it is effective to arrange an optical compensation film (retardation film) with a suitable retardation between a liquid crystal cell and a polarizer.

Generally, it is desirable that a retardation (Ro) in the in-plane direction is in a range of 20 to 200 nm, and a retardation (Rt) in the thickness direction is in a range of 70 to 400 nm. It is also desirable that the optical compensation film of the present invention has retardations in the above ranges.

Here, $$Ro = (nx - ny) \times d$$

$$Rt = ((nx + ny)/2 - nz) \times d$$

(In these formulas, nx represents a refractive index in a slow axis direction in a plane of a retardation film, ny represents a refractive index in a direction perpendicular to the slow axis in a plane, nz represents a retractive index in a thickness direction and d represents the thickness (nm) of the retardation film respectively. The measuring wavelength for the refractive index is 590 nm.)

The above-described refractive index can be determined by the use of, for example, KOBRA-21ADH (manufactured by Oji Instrument Co., Ltd.) at a wavelength of 590 nm under an environment of 23° C. and 55% RH.

<<Scattered Light Measured by a Goniophotometer>>

Even if the optical compensation film according to the first embodiment of the present invention is subjected to a stretching process in order to obtain the above-mentioned retardation, it is characterized that the scattered light measured by the goniophotometer exists in a specified range.

Although it is required to reduce haze of a cellulose ester film in order to improve the front contrast, it has been learned that the front contrast cannot be necessarily made to a desired value only by the reduction of the haze corresponding to straight going light.

On the other hand, the present inventors found out that it is required to eliminate anisotropic scatter. The anisotropic scatter means a difference in scattered light intensity between the slow axis direction of a film and the direction perpendicular to the slow axis direction. This anisotropic scatter can be measured by the goniophotometer.

<Measuring Device for Anisotropic Scatter>

Figure 1:
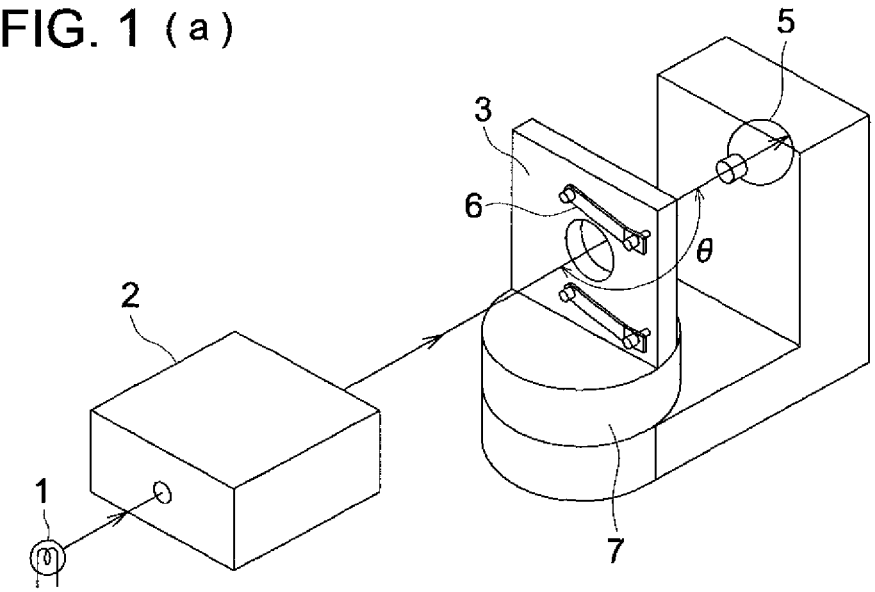
FIG. 1 is a schematic diagram of a goniophotometer.
Figure 1:
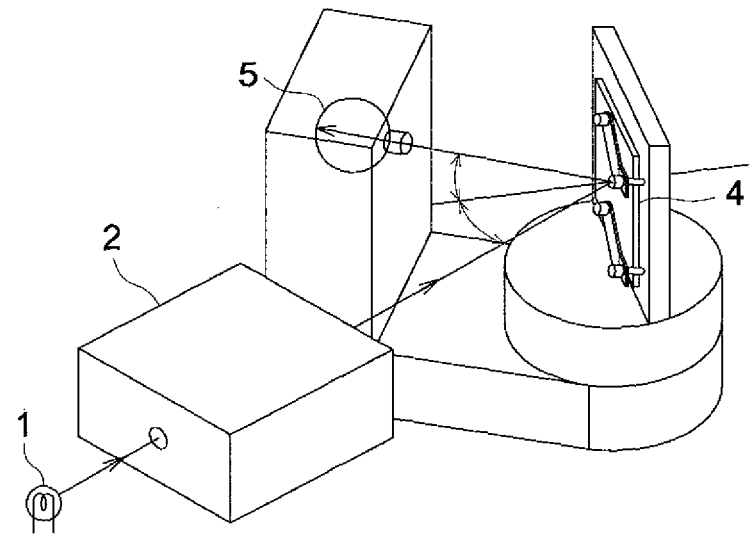

The outline of a goniophotometer (type: GP-1-3D, manufactured by Optic Corporation) is shown in FIG. 1. The goniophotometer comprises a light source ramp 1, a spectroscope 2, a sample stand 3 (it is also called a stage), a sample 4 (no-description), and a light receiving section 5.

The light source employs a 12V50 W halogen ball lamp, and the light receiving section employs a photomultiplier tube (Photomul; Hamamatsu photonics R636-10).

FIG. 1(a) shows an arrangement of a light source lamp, a spectroscope, a sample stand (stage), and an integrating ball to measure the intensity of light at the time of the reference measurement to measure reference light or at the time of measuring transmittance.

FIG. 1(b) shows an arrangement of the light source lamp, the spectroscope, the sample stand, and the integrating ball at the time of measuring the reflectance of a measured sample placed on the sample stand.

The sample stand usually serves as a measured sample vertically hooking type, and the measured sample is fixed with a pressing clip and an angle detecting rotating table is provided below the sample stand. The sample stand is structure such that transmittance and a reflectance can be measured by a step of changing an angle between a sample plane and a light incident plane.

The anisotropic scattered light intensity according to first embodiment of the present invention can be measured by the arrangement showing in. FIG. 1(a). That is, the scattered light intensity measurement for a film with an incident light at 90° in a scattered light profile of the goniophotometer means to measure a scattered light intensity when light is provided perpendicularly to a sample from the light source of the goniophotometer.

The case where the scattered light intensity is detected at the position of 130° from the light source means a scattered light intensity measured when the angle θ made by the normal line direction of a light source shown in FIG. 1 and the direction connecting the viewpoint for the sample and an integrating sphere is 130°.

In the first embodiment of the present invention, in the measurement of the scattered light intensity at the position where this angle θ is 130°, a difference in scattered light intensity between the case where a film slow axis is installed horizontally to a sample stand and the case where the film slow axis is installed vertically to the sample stand is characterized by being 0.05 or less.

The usual level can be used in order to take the horizontal and vertical conditions.

Although various angles may be chosen as the angle θ, in the present invention, the angle θ was made 130° at which the correlation with the front contrast being the final evaluation as a liquid crystal display was highest.

At the time of making it horizontal, the scattered light intensity at the time of making it vertical is 0.01 to 0.25, 0.20 or less are desirable, and 0.10 or less are still more desirable.

The smaller the difference in scattered light intensity is, the better it is.

In order to attain the scattered light intensity according to the first embodiment of the present invention, it is desirable that an optical compensation film is an cellulose ester resin containing (meth)acrylic polymer; and an esterified compound in which all or a part of OH groups in a compound (A) or in a compound (B) are esterified, wherein the compound (A) has one of a furanose structure and a pyranose structure, and in the compound (B), two or more and twelve or less of at least one kind of a furanose structure and a pyranose structure are bonded.

An optical compensation film according to the second embodiment of the present invention is characterized by containing (meth)acrylic polymer and an esterified compound in which all or a part of OH groups in a compound (A) or in a compound (B) are esterified, wherein the compound (A) has one of a furanose structure and a pyranose structure, and in the compound (B), two or more and twelve or less of at least one kind of a furanose structure and a pyranose structure are bonded.

Since the (meth)acrylic polymer of the present invention is a polymer which exhibits negative birefringence to the stretching direction of a film containing it, it has been used for adjustment of a retardation. However, the present inventor found that when the (meth)acrylic polymer is used together with an esterified compound in which all or a part of OH group in a compound (A) are esterified, wherein the compound (A) has one of a furanose structure and a pyranose structure, or an esterified compound in which all or a part of OH group in a compound (B) are esterified, wherein in the compound (B), two or more and twelve or less of at least one kind of a furanose structure and a pyranose structure are bonded, it becomes possible to provide an optical compensation film which is excellent in visibility (light leakage, color tone unevenness, front contrast) and satisfies both a retardation and wavelength dispersion characteristic Hereinafter, these compounds will be explained.

<(Meth)acrylic Polymer>

As a (meth)acrylic polymer used for the present invention, when it is contained in an optical compensation film, it is desirable that it exhibits negative birefringence to the stretching direction as a function, and although its structure is not limited specifically, it is desirable that it is a polymer which is obtained by a process of polymerizing an ethylenic unsaturated monomer and has a weight average molecular weight of 500 or more and 30000 or less.

(Test Method of the Birefringence of a (Meth)Acrylic Polymer

After a (meth)acrylic polymer was dissolved in a solvent, the resultant solution was cast to form a film. The film was dried by heating. The birefringence of the film having a transmittance of 80% or more was evaluated.

A refractive index measurement was conducted by an Abbe refractive index meter 4T (Product made by Atago Co.) with a multi wavelength light source. The refractive index of the stretching direction was set to ny, and the refractive index of the in-plane direction perpendicular to the stretching direction was set to nx. It is judged that a film satisfying the formula of ((ny−nx)<0) about each refractive index for 550 nm has a negative birefringence to the stretching direction of a (meth)acrylic polymer.

The (meth)acrylic polymer used for the present invention and having a weight average molecular weight of 500 or more and 30000 or less may be a (meth)acrylic polymer having an aromatic ring in a side chain or a (Meth)acrylic polymer having a cyclohexyl group in a side chain.

In the case where for example, the optical compensation film is a cellulose ester film especially desirable in the present invention, when the composition of the polymer is controlled with the polymer having a weight average molecular weight of 500 or more and 30000 or less, the compatibility of the cellulose ester and the polymer can be made good.

Among the (meth)acrylic polymer having an aromatic ring in a side chain and the (meth)acrylic polymer having a cyclohexyl group in a side chain, when the (meth)acrylic polymer has a weight average molecular weight of 500 or more and 10000 or less, in addition to the above, a cellulose ester film after a process of producing a film is excellent in transparency, has a very low moisture vapor transmission and exhibits excellent performances as a polarizing plate protective film.

Since the polymer has a weight average molecular weight of 500 or more and 30000 or less, it is considered that this polymer belongs between an oligomer and low molecular weight polymers. In order to synthesize such a polymer, since the control of molecular weight may be difficult by the usual polymerization method, it is desirable to use a method of making a molecular weight not so large and being able to make the molecular weight uniform as far as possible.

Further, the cellulose ester film Y of the present invention preferably contains the polymer X having a weight average molecular weight of 2000 or more without exceeding 30000, the aforementioned polymer X having been obtained by copolymerization between the ethylenic unsaturated monomer Xa without containing an aromatic ring and a hydrophilic group in the molecule, and the ethylenic unsaturated monomer Xb containing the hydrophilic group without an aromatic ring in the molecule; and the polymer Y having a weight average molecular weight of 500 or more without exceeding 3000, the aforementioned polymer Y having been obtained by polymerization of ethylenic unsaturated monomer Ya without aromatic ring.

<Polymer X and Polymer Y>

Various methods are known and anyone can also be adopted as a way of adjusting Ro and Rth of the present invention. However, from a point of transparency, it is desirable that a cellulose ester film contains a polymer X having an average molecular weight of 2000 to 30000 and obtained by copolymerization of an ethylenic unsaturated monomer Xa not having an aromatic ring and a hydrophilic group in a molecule thereof and an ethylenic unsaturated monomer Xb having a hydrophilic group and not having an aromatic ring in a molecule thereof, preferably contains a polymer Y having an average molecular weight of 500 to 3000 and obtained by polymerization of an ethylenic unsaturated monomer Ya not having an aromatic ring.

A polymer X used in the present invention is a polymer having a weight average molecular weight of 2000 or more without exceeding 30000, obtained by copolymerization between an ethylenic unsaturated monomer Xa without containing aromatic ring and hydrophilic group in its molecule and an ethylenic unsaturated monomer Xb containing a hydrophilic group without an aromatic ring in its molecule.

Preferably, Xa is an acryl monomer or a methacryl monomer each not having an aromatic ring and a hydrophilic group in a molecule thereof and Xb is an acryl monomer or a methacryl monomer each having a hydrophilic group and not having an aromatic ring in a molecule thereof.

The polymer X used in the present invention is expressed by the following Formula (X):

-(Xa)$m$-(Xb)$n$-(Xc)$p$-   Formula (X)

(In Formula (X), Xa is an ethylenic unsaturated monomer not having an aromatic ring and a hydroxyl group in its molecule, Xb is an ethylenic unsaturated monomer not having an aromatic ring and having a hydroxyl group in its molecule, and Xc is a copolymerizable ethylenic unsaturated monomer except Xa and Xb. m, n, and p represent a mole composition ratio, provided that m is not 0, and m+n+p=100.

Further, preferable examples of the polymer (X) include a polymer represented by the following Formula (X-1):

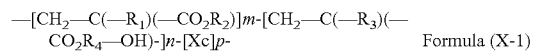

—[CH$_2$—C(—R$_1$)(—CO$_2$R$_2$)]$m$-[CH$_2$—C(—R$_3$)(—CO$_2$R$_4$—OH)-]$n$-[Xc]$p$-   Formula (X-1)

In the above Formula (X-1), R$_1$ and R$_3$ represent a hydrogen atom or a methyl group, R$_2$ represents an alkyl group or a cycloalkyl each having carbon atoms of 1 to 12, and R$_4$ represents —CH$_2$—, —C$_2$H$_4$—, or —C$_3$H$_6$—. Xc represents a monomer unit polymerizable with [CH$_2$—C(—R1)(—CO$_2$R2)] or [CH$_2$—C(—R3)(—CO$_2$R4-OH)-]. m n and p represent a mole composition ratio, provided that m is not 0 and m+n+p=100.)

Although examples of monomers as a monomer unit constituting the polymer X related to the present invention are listed below, the monomer is not limited to these.

In X, the hydroxyl group refers not only to a hydroxyl group but to a group having an ethylene oxide chain.

The ethylenic unsaturated monomer Xa without containing either aromatic ring or hydrophilic group in a molecule is exemplified by methyl acrylate, ethyl acrylate, propyl acrylate (i-, n-), butyl acrylate (n-, i-, s-, t-), pentyl acrylate (n-, i-, s-), hexyl acrylate (n-, i-), heptyl acrylate (n-, i-), octyl acrylate (n-, i-), nonyl acrylate (n-, i-), myristyl acrylate (n-, i-), (2-ethylhexyl)acrylate, (ε-caprolactone) acrylate, or a monomer in which the above acrylic ester is changed to a methacrylic ester. Among them, methyl acrylate, ethyl acrylate, methyl methacrylate, ethyl methacrylate or propyl methacrylate (i-, n-) is preferably used.

The ethylenic unsaturated monomer Xb containing the hydrophilic group without an aromatic ring in the molecule is preferably an acrylic acid or methacrylic acid ester as a monomer unit having a hydroxyl group. The preferred one is exemplified by (2-hydroxy ethyl)acrylate, (2-hydroxy propyl) acrylate, (3-hydroxy propyl)acrylate, (4-hydroxy butyl) acrylate, and (2-hydroxy butyl)acrylate, or these substances with the acrylate thereof replaced by methacrylate. Of these, (2-hydroxy ethyl)acrylate, (2-hydroxy ethyl)methacrylate, (2-hydroxy propyl) acrylate, and (3-hydroxy propyl)acrylate are more preferably used.

If a monomer as Xc is a copolymerizable ethylenic unsaturated monomer other than Xa and Xb, the monomer is not limited, however, it is desirable that the monomer has not an acromatic ring.

The mole composition ratio m:n of Xa and Xb is preferably in the range of 99:1 to 65:35, more preferably in the range of 95:5 to 75:25. The mole composition ratio "p" of Xc is 0 to 10. Xc may be a plurality of monomer units.

If the mole composition ratio Xa is greater, compatibility with the cellulose ester will be improved but retardation value Rt along the film thickness will be increased.

Further, the mole composition ratio of Xb exceeds the above range, haze may be caused at the time of film production. It may desirable to optimize these and determine the mole composition ratio of Xa and Xb.

The polymer X preferably has a weight average molecular weight of 5000 or more without exceeding 30000, more preferably a weight average molecular weight of 8000 or more without exceeding 25000.

If the molecular weight is greater than 5000, there are such advantages as smaller dimensional variation of the cellulose ester film at a high temperature and humidity and smaller curl as a polarizing plate protective film.

When the weight average molecular weight does not exceeds 30000, compatibility with cellulose ester will be improved, refraining a problem as bleed-out at a high temperature and high humidity or an optical haze immediately after formation of the film.

The weight average molecular weight of polymer X in the present invention can be adjusted by the known method for molecular weight adjustment. Such a method for molecular weight adjustment can be exemplified by the method of adding a chain transfer agent such as carbon tetrachloride, laurylmercaptan, and octyl thioglycolate.

The polymerization temperature is kept within the range from room temperature through 130° C., preferably from 50 through 100° C. This temperature or polymerization reaction time can be adjusted.

The weight average molecular weight can be measured according to the following method:

(Method of Measuring the Molecular Weight)

The weight average molecular weight Mw is measured by gel permeation chromatography.

The following describes the measurement conditions:
Solvent: methylene chloride
Column: Shodex K806, K805 and R803G (Three pieces manufactured by Showa Denko K.K. were connected for use)
Column temperature: 25° C.
Sample concentration: 0.1% by mass
Detector: RI Model 504 (manufactured by GL Science Co., Ltd.)
Pump: L6000 (manufactured by Hitachi Limited)
Flow rate: 1.0 ml/min.
Calibration curve: The calibration curve using 13 samples of the standard polystyrene STK standard polystyrene (manufactured by Toso Co., Ltd.) was employed, wherein Mw=1000000 through 500. These 13 samples were placed at an approximately equally spaced interval.

The polymer Y used in the present invention is a polymer having a weight average molecular weight of 500 or more without exceeding 3000, being produced by polymerization of ethylenic unsaturated monomer Ya without aromatic ring.

If the polymer has a weight average molecular weight of 500 or more, it is desirable, because the amount of the remaining monomer will be reduced.

If the weight average molecular weight is 3000 or less, it is desirable, because the performance for reducing the level of retardation Rt can be maintained. Ya is preferably an acryl monomer or a methacryl monomer each not having an aromatic ring.

A polymer Y used in the present invention is preferably expressed by the following Formula (Y):

-[Ya]k-[Yb]q-    Formula (Y)

In the above Formula (Y), Ya is an ethylenic unsaturated monomer not having an aromatic ring in its molecule and Yb is an ethylenic unsaturated monomer copolymerizable with Ya. k and q represent a mole composition ratio, provided that k is not 0 and k+q=100.

Further, preferable examples of the polymer Y related to the present invention include a polymer represented by the following Formula (Y-1):

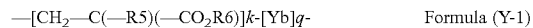
—[CH$_2$—C(—R5)(—CO$_2$R6)]k-[Yb]q-    Formula (Y-1)

(In the above Formula (Y-1), R5 is a hydrogen atom or a methyl group, and R6 is an alkyl group or a cycloalkyl group having a carbon number of 1 to 12. Yb is a monomer unit polymerizable with [CH$_2$—C(—R5) (—CO$_2$R6)]. k and q are a mole composition ratio, provided that k is not 0, and k+p=100.)

Yb is not specifically limited, as far as it is an ethylenic unsaturated monomer copolymerizable with [CH$_2$—C(—R5) (—CO$_2$R6)] being Ya. Yb may be plural. k+q 100, and q is preferably 1 to 30.

The ethylenic unsaturated monomer Ya constituting the polymer Y obtained by polymerization of the ethylenic unsaturated monomer without containing an aromatic ring is exemplified by an acrylic acid ester such as methyl acrylate, ethyl acrylate, propyl acrylate (i-, n-), butyl acrylate (n-, i-, t-), pentyl acrylate (n-, i-, s-), hexyl acrylate (n-, i-) heptyl acrylate (n-, i-), octyl acrylate (n-, i-), nonyl acrylate (n-, i-), myristyl acrylate (n-, i-), cyclohexyl acrylate, (2-ethylhexyl) acrylate, (ε-caprolactone) acrylate, (2-hydroxyethyl)acrylate, (2-hydroxypropyl)acrylate, (3-hydroxypropyl)acrylate, (4-hydroxybutyl)acrylate, (2-hydroxybutyl)acrylate; a methacrylic acid ester such as the one with the aforementioned acrylate replaced by methacrylate; and an unsaturated acid such as acrylic acid, methacrylic acid, maleic anhydride, crotonic acid and itaconic acid.

A monomer as Yb is not specifically limited, if the monomer is an ethylenic unsaturated monomer copolymerizable with Ya. The monomer as Yb is exemplified by:

a vinyl ester such as vinyl acetate, vinyl propionate, vinyl butyrate, vinyl valerate, vinyl pivalate, vinyl caproate, vinyl caprate, vinyl laurate, vinyl myristate, vinyl palmitate, vinyl stearate, vinyl cyclohexane carboxylate, vinyl octoate, vinyl methacrylate, vinyl crotonate, vinyl sorbate, and vinyl cinnamate. Yb may be plural.

When producing such a polymer X and Y, the molecular weight cannot be easily controlled by the conventional polymerization. In this case, it is preferred to use a method capable of ensuring the uniform molecular weight without much increasing the molecular weight.

Such a preferred polymerization method is exemplified by: a method of using the peroxide polymerization initiator such as cumene peroxide and t-butyl hydroperoxide; a method of using a greater amount of polymerization initiator than in the conventional way; a method of using a chain transfer agent such as a mercapto compound and carbon tetrachloride in addition to the polymerization initiator; a method of using a polymerization terminator such as benzoquinone and dinitrobenzene in addition to the polymerization initiator; and a method for bulk polymerization based on a compound including one thiol group and secondary hydroxyl group or a polymerization catalyst using this compound and organic metal compound as disclosed in the Japanese Non-Examined Patent Publication 2000-128911 or 2000-344823. These methods are all preferably used.

Especially, for the polymer Y, a polymerization method which uses a compound having a thiol group and a hydroxyl group of a 2nd class in a molecule as a chain transfer agent, is desirable. In this case, at a terminal end of the polymer Y, it has a hydroxyl group resulting from a polymerization catalyst and a chain transfer agent and thioether. With this terminal residue group, the compatibility of Y and cellulose ester can be adjusted.

The hydroxyl group value of the polymer X is preferably 30 through 150 [mg KOH/g]

(Method of Measuring the Hydroxyl Group Value)

The hydroxyl group value was measured according to the JIS K 0070 (1992). The hydroxyl group value can be defined as the value in terms of mg of the potassium hydroxide required to neutralize the acetic acid bonded with the hydroxyl group, when 1 g of the sample is acetylated.

To put it more specifically, the following steps were taken: weighing X g (about 1 g) of sample accurately; putting it into a flask; adding 20 ml of acetylation reagent (pyridine added to 20 ml of acetic anhydride to get 400 ml) accurately thereto; providing the outlet of the flask with an air cooling tube; healing the solution in a glycerine bath having a temperature of 95 through 100° C.; cooling the solution after the lapse of one hour and 30 minutes; and adding 1 ml of purified water through the air cooling tube so that the acetic anhydride was decomposed into acetic acid.

This was followed by the step of titration by a potential difference titration apparatus using a 0.5 mol/L potassium hydroxide ethanol solution. The inflection point of the titration curve having been obtained was defined as a terminal point. Then titration was carried out in an idle test wherein a sample was not put therein.

Thus, the inflection point of the titration curve was obtained, and the hydroxyl group value was calculated according to the following Equation.

$$\text{Hydroxyl group value} = \{(B-C) \times f \times 28.05/X\} + D$$

where B denotes the amount (ml) of 0.5 mol/L potassium hydroxide ethanol solution used in the idle test, C indicates the amount (ml) of 0.5 mol/L potassium hydroxide ethanol solution used in the titration, f shows the factor of 0.5 mol/L potassium hydroxide ethanol solution, D represents an acid value, and 28.05 is equivalent to a half of 56.11 as 1 mol potassium hydroxide.

The above-mentioned polymer X and polymer Y each excels in compatibility with a cellulose ester. Also these polymers have neither evaporation nor volatilization, these polymers are excellent in manufacturing efficiency, and their permanence properties as a protection film for polarizing plates are preferable, and their water vapour permeability is small, and thy are excellent in dimensional stability.

The contents of the polymers X and Y in the optical compensation film preferably meet the following Formulae (i) and (ii): assuming that the content of the polymer X is Xg (% by mass=the mass of the polymer X/the mass of the cellulose ester×100), and that of the polymer Y is Yg (% by mass), $$5 \leq Xg + Yg \leq 35 (\% \text{ by mass}) \quad \text{Formula (i)}$$

$$0.05 \leq Yg/(Xg+Yg) \leq 0.4 \quad \text{Formula (ii)}$$

where Formula (i) is preferably in the range from 10 through 25% by mass (or weight). When the total amount of the polymers X and Y must be 5% by mass or more; a sufficient reduction in retardation value Rt can be achieved. Further, when the total amount is 35% by mass or less; the adhesiveness of the polarizer PVA will be excellent.

The polymers X and Y as materials constituting the aforementioned doping solution can be directly added and dissolved. Alternatively, they can be put into the doping solution after having been dissolved in the organic solvent for dissolving the cellulose ester.

<<Compound Having a Furanose Structure or a Pyranose Structure to be Used in the Invention>>

An optical compensation film of the present invention is characterized by containing, together with (meth)acrylic polymer; an esterified compound in which all or a part of OH groups in a compound (A) having one of a furanose structure and a pyranose structure or in a compound (B) in which two to twelve of at least one type of a furanose structure and a pyranose structure are bonded, are esterified.

In the present invention, the esterified compound of the compound (A) and the esterified compound of the compound (B) related to the present invention are named generally a sugar ester compound.

The esterified compound is a benzoate ester of a monosaccharide (α-glucose, β-fructose) or a benzonate ester of a polysaccharide (m+n=2 to 12) produced by dehydration condensation of at least two optional positions of —$OR_{12}$, —$OR_{15}$, —$OR_{22}$, and $OR_{25}$ of a monosaccharide represented by Formula (A).

The benzoic acid in the above-mentioned Formula (A) may have a substituent further, such as an alkyl group, an alkenyl group, an alkoxyl group, and a phenyl group, and also these alkyl group, alkenyl group, and phenyl group may have a substituent. As referable examples of the compound (A) and the compound (B), for example, the following compounds can be listed, however, the present invention is not limited to those compounds.

As referable examples of the compound (A), glucose, galactose, mannose, fructose, xylose, and arabinose can be usable.

As referable examples of the compound (B), lactose, sucrose, nystose, 1F-fructosylnystose, stachyose, maltitol, lactitol, lactulose, cellobiose, maltose, cellotriose, maltotriose, raffinose and kestose can be usable.

In addition, gentiobiose, gentiotriose, gentiotetraose, xylotriose, and galactosyl-sucrose may be employed.

Among the compound (A) and the compound (B), a compound having both of the furanose structure and the pyranose structure is preferable. As the compound having both of the furanose structure and the pyranose structure, sucrose, kestose, nystose 1F-fructosylnystose, and stachyose may be usable, in particular, sucrose can be preferably usable.

Further, the compound (B) may be preferably a compound in which two to three of at least one kind of the furanose structure and the pyranose structure are bonded.

Monocarboxylic acid to be used to esterify all or a part of OH groups of the compound (A) and the compound (B), is not specifically limited and known an aliphatic monocarboxylic acid, an alicyclic monocarboxylic acid and an aromatic monocarboxylic acid can be used. The monocarboxylic acid may be used singly or in combination of two or more kinds thereof.

Examples of preferable aliphatic monocarboxylic acid include a saturated fatty acid such as acetic acid, propionic acid, butylic acid, isobutylic acid, valerianic acid, capronic acid, enanthic acid, caprylic acid, pelargonic acid, capric acid, 2-ethyl-hexanecarboxylic acid, undecylic acid, lauric acid, tridecylic acid, myristic acid, pentadecylic acid, palmitic acid, heptadecylic acid, stearic acid, nonadecanic acid, arachidic acid, behenic acid, lignoceric acid, cerotic acid, heptacosanoic acid, montanic acid and melissic acid, and a unsaturated fatty acid such as undecylic acid, oleic acid, sorbic acid, linolic acid, linolenic acid, arachidonic acid and octenic acid.

As examples of preferable aliphatic carboxylic acid, cyclopentene carboxylic acid, cyclohexane carboxylic acid, cycloctane carboxylic acid and derivatives thereof can be cited.

Examples of the aromatic monocarboxylic acid include benzoic acid, an aromatic monocarboxylic acid formed by introducing one to five alkyl or alkoxy groups into the benzene ring of benzoic acid such as toluic acid, an aromatic monocarboxylic acid having two or more benzene rings such as cinnamic acid, benzilic acid, biphenyl carboxylic acid, naphthalene carboxylic acid, tetralin carboxylic acid and derivatives thereof. More concretely, xylic acid, hemellitic acid, mesitylenic acid, prehnitylic acid, γ-isodurylic acid, isodurylic acid, mesitoic acid, α-isodurylic acid, cuminic acid, α-toluic acid, hydratropic acid, atropic acid, cinnamic acid, hydrocinnamic acid, salicylic acid, o-anisic acid, m-anisic acid, p-anisic acid, creosotic acid, o-homosalicylic acid, m-homosalicylic acid, p-homosalicylic acid, o-pyrocatechuic acid, β-rescrcylic acid, vanillic acid, isovanillic acid, veratric acid, o-veratric acid, gallic acid, asaronic acid, mandelic acid, homoanisic acid, Homovanillic acid, homoveratric acid, o-homoveratric acid, phthalonic acid, p-coumaric acid may be employed. Among them, benzoic acid is particularly preferable.

Among the esterified compound (sugar ester compound) of the compound (A) and the compound (B), an acetylated compound in which acetyl groups are introduced by esterification, is preferable.

Details of the production method of the above acetylated compounds are described in Tokkai Hei 8-245678.

In addition to the esterified compound of the compound (A) and the compound (B), an esterified compound of oligosaccharide can be employed as an esterified compound of a compound in which three to twelve of at least one type of a furanose structure and a pyranose structure are bonded.

The oligosaccharide can be produced by acting a ferment such as amylase to starch, cane sugar and so on. As a oligosaccharide usable for the invention, marthe oligosaccharide, isomarthe oligosaccharide, fructo oligosaccharide, galact oligosaccharide, and xylo oligosaccharide may be listed.

The oligosaccharide can be acetylated with the same method as that for the above compositions (A) and (B).

Next, a production example of an estrified compound is described.

Into a solution in which 100 ml of pyridine was added into 29.8 g, 166 mmol of glucose, 200 ml of acetic anhydride was dropped, and then a reaction among them was conducted for 24 hours. Subsequently, the resultant solution was condensed with an evaporator and the condensed solution was put in iced water.

After leaving it alone for one hour, the solution was filtered with a glass filter so as to separate a solid and water, and then the solid on the glass filter was dissolved with chloroform, and the solution is separated with chilled water until the solution became neutrality.

After separating an organic layer, it was dried with anhydrous sodium sulfate. Further, after removing the anhydrous sodium sulfate by filtration, chloroform was removed with an evaporator, and then conducting drying under reduced pressure, whereby glucose penta acetate (58.8 g, 150 mmol, 90.9%) was obtained.

Incidentally, the above monocarboxylic acid can be used instead of the above-mentioned acetic anhydride.

Concrete examples of the esterified compound (a sugar ester compound) of the present invention are listed below but the invention is not limited to them.

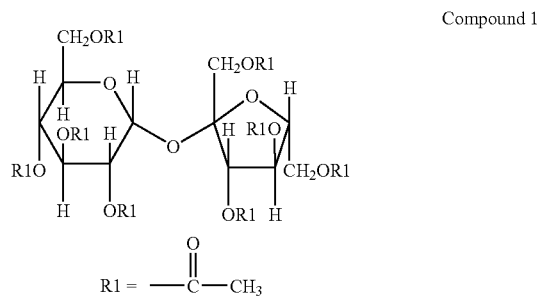

Compound 1

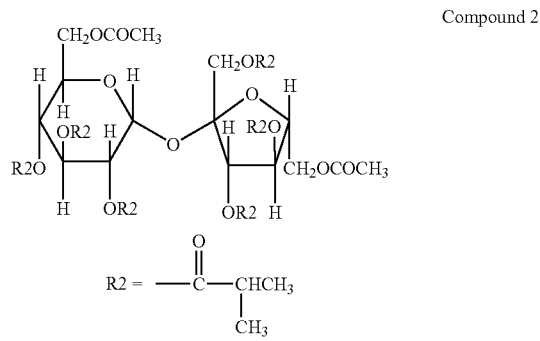

Compound 2

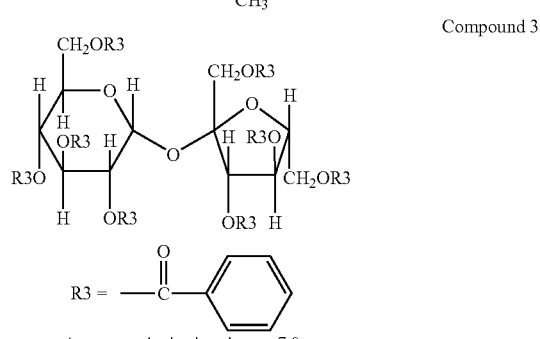

Compound 3

Average substitution degree 7.0

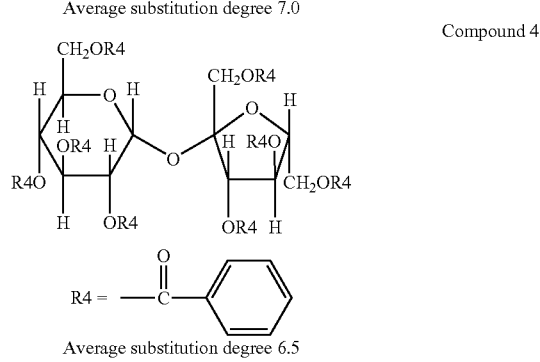

Compound 4

Average substitution degree 6.5

-continued
Compound 5
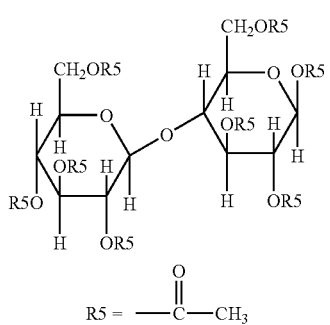
Compound 6
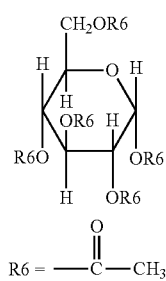
Compound 7
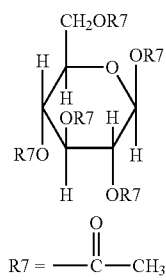
Compound 8
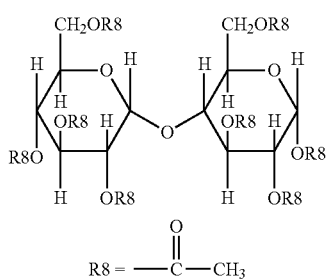
Compound 9
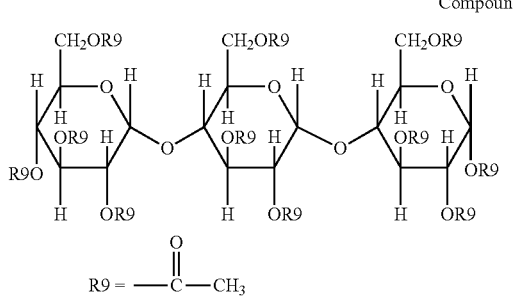
-continued
Compound 10
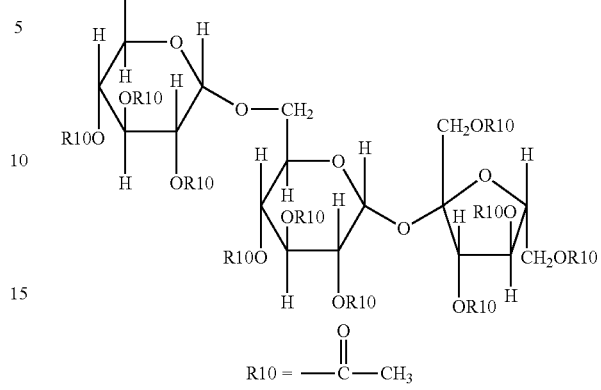
Compound 11
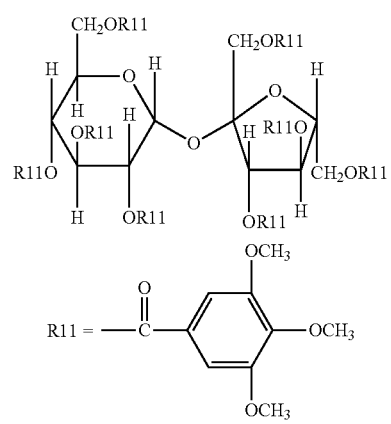
Compound 12
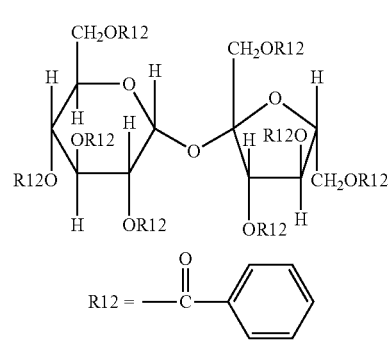
Average substitiution degree 7.0
Compound 13
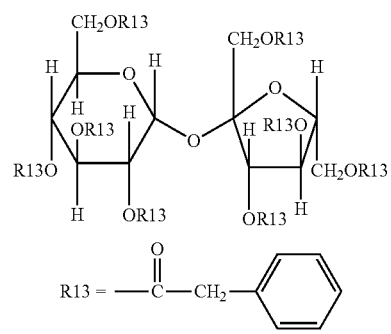

Compound 14
Compound 15
Compound 16
Compound 17
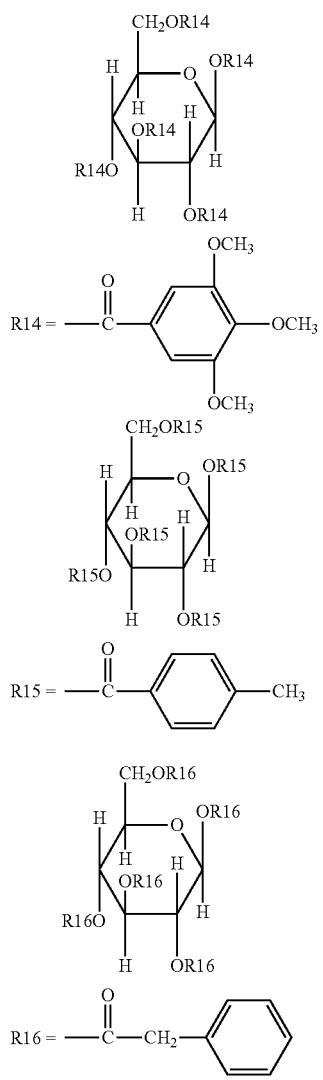
Compound 18
Compound 19
Compound 20
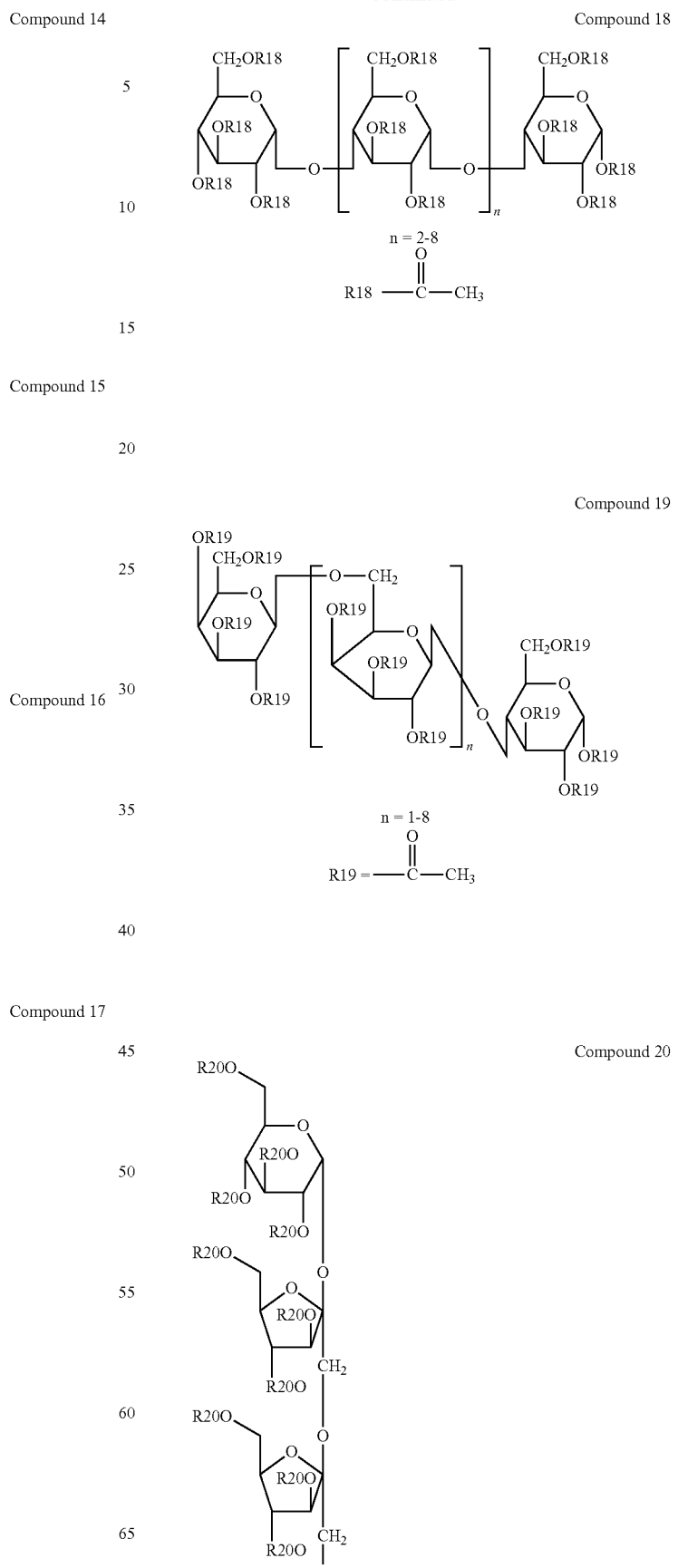

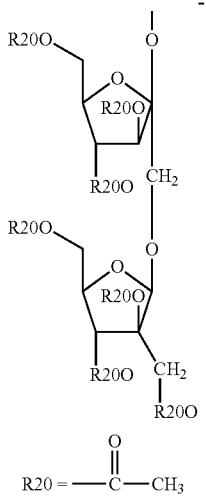

Coumpound 21

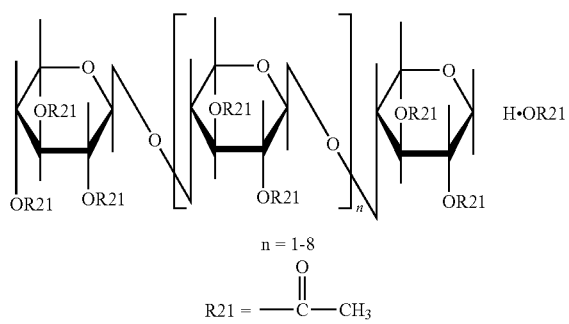

Compound 22

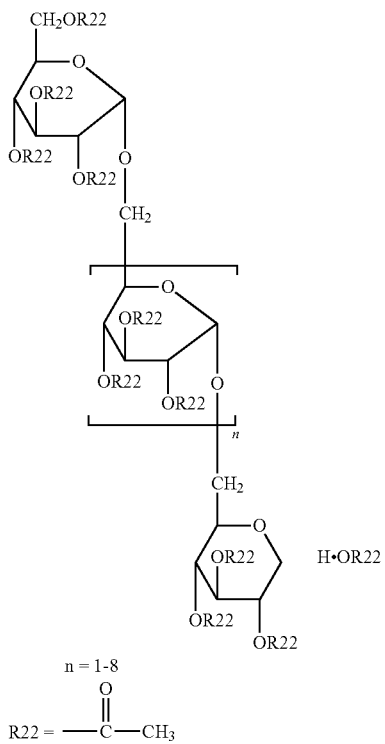

In order to stabilize a display appearance quality, the optical compensation film of the invention preferably contains an esterified compound in which all or a part of OH groups in a compound (A) consisting of one of a furanose structure or in a compound (B) consisting of two to twelve of at least one type of a furanose structure and a pyranose structure which are bonded are esterified, in an amount of 1 to 30% by weight, preferably from 5 to 30% by weight. By containing the esterified compound within the above range, the superior effects of the present invention can be expressed, and also bleed-out can be avoided.

Further, the cellulose derivative and the esterified compound in which all or a part of OH groups in a compound (A) consisting of one of a furanose structure or in a compound (B) consisting of two to twelve of at least one type of a furanose structure and a pyranose structure which are bonded are esterified, can be used together with other plasticizers.

<Cellulose Ester>

The optical compensation film of the present invention preferably contains cellulose ester and the cellulose ester utilized is not specifically limited, however, cellulose ester may be carboxylic ester having a carbon number of approximately 2 to 22 or may be ester of aromatic carboxylic acid and is specifically preferably lower fatty acid ester of cellulose.

Lower fatty acid in lower fatty acid ester of cellulose means fatty acid having a carbon number of not more than 6. Acyl groups bonding to hydroxyl groups may be either a straight chain or branched, or may form a ring. Further, acyl groups may be substituted by other substituents.

In the case of the same substitution degree, since double referaction is decreased when the aforesaid carbon number is large, a carbon number is preferably selected from acyl groups having a carbon number of 2 to 6. The carbon number as the aforesaid cellulose ester is preferably 2 to 4 and more preferably 2 to 3.

The aforesaid cellulose ester can also employ an acyl group derived from mixed acid and specifically preferably an acyl group having a carbon number of 2 and 3 or a carbon number of 2 and 4. As cellulose ester utilized in this invention, mixed fatty acid ester of cellulose in which a propionate group or a butyrate group other than an acetyl group is attached, such as cellulose acetate propionate, cellulose acetate butyrate or cellulose acetate propionate butyrate can be employed.

A butyryl group constituting butyrate may be either a straight chain or branched. Cellulose ester specifically preferably utilized in this invention is cellulose acetate, cellulose acetate butyrate, cellulose acetate propionate or cellulose acetate phthalate.

Further, a retardation value can be appropriately controlled by such as the type of the aforesaid acyl group of cellulose ester and a substitution degree of an acyl group to a pyranose ring of the cellulose resin skeleton.

Cellulose ester preferable in this invention is those simultaneously satisfying equations (1) and (2).

$$2.0 \leq X+Y \leq 3.0 \qquad \text{Equation (1)}$$

$$0 \leq Y \leq 1.5 \qquad \text{Equation (2)}$$

wherein, X is a substitution degree of an acetyl group, Y is a substitution degree of an propionyl group or a butyryl group. Those satisfying the above-described two equations are suitable for manufacturing an optical compensation film which exhibits excellent optical characteristics to meet an object of this invention.

Moreover, in order to obtain an optical characteristics matching with the object of the present invention, resins having respective different substitution degrees may be mixed. As the mixing ratio, 10:90 to 90:10 are desirable.

Among them, cellulose acetate propionate may be specifically preferably utilized. In cellulose acetate propionate, X is in $1.0 \leq X \leq 2.5$, and it is preferable that Y and X+Y are $0.1 \leq Y \leq 1.5$ and $2.0 \leq X+Y \leq 3.0$. A substitution degree of an acyl group can be measured by a measurement method based on ASTM-D817-96.

When the aforesaid substitution degree of an acyl group is excessively low, the unreacted portion against hydroxyl groups of a pyranose ring constituting a skeleton of cellulose resin increases to make a large residual amount of said hydroxyl groups, resulting in decrease of ability to restrain variation of retardation depending on humidity and to protect a polarizer as polarizing plate protective film, which is not preferable.

The number average molecular weight of cellulose ester utilized in this invention is preferably in a range of 60,000 to 300,000 because of large mechanical strength of prepared film. Those having a number average molecular weight of 70,000 to 200,000 are more preferably utilized.

The number average molecular weight of cellulose ester can be measured as follows.

Measurement is performed by means of high speed liquid chromatography under the following condition.

Solvent: Acetone
Column: MPW×1 (produced by Toso Co. Ltd.)
Sample concentration: 0.2 (weight/volume):
Flow rate: 1.0 ml/min
Sample injection quantity: 300 µl
Standard sample: standard polystyrene
Temperature 23° C.

Cellulose as a starting material of cellulose ester utilized in this invention is not specifically limited, and includes such as cotton linter, wood pulp and kenaf. Further, cellulose ester prepared from them can be utilized by mixing each of them at an arbitrary ratio.

Cellulose ester usable in this invention, in the case that an acylation agent as a cellulose starting material is acid anhydride, is prepared by a reaction utilizing a proton type catalyst such as sulfuric acid in an organic acid such as acetic acid or in an organic solvent such as methylene chloride. In the case that an acylation agent is acid chloride ($CH_3COCl$, $C_2H_5COCl$, $C_3H_7COCl$), the reaction is performed utilizing a basic compound such as amine as a catalyst.

Specifically, the synthesis can be performed referring to a method described in JP-A 10-54804.

An average substitution degree of an acyl group at the 6-position of a glucose unit of cellulose ester utilized in this invention is preferably 0.5 to 0.9.

A highly reactive primary hydroxyl group is present at the 6-position of a glucose unit constituting cellulose ester, different from the 2-position and the 3-position, and this primary hydroxyl group preferentially forms sulfuric ester in a manufacturing process of cellulose ester employing sulfuric acid as a catalyst.

Therefore, in an esterification reaction of cellulose, the average substitution degree at the 2-position and the 3 position of a glucose unit can be made larger that that at the 6-position by increasing the amount of sulfuric acid as a catalyst, compared to general cellulose ester.

Further, when necessary, since a hydroxyl group at the 6-position of a glucose unit can be selectively protected when cellulose is tritylated, it is possible to make the average substitution degree at 2-position and the 3-position of a glucose unit larger than that at the 6-position, by protecting a hydroxyl group at the 6-position by tritylation and releasing a trityl group (a protective group) after esterification.

Specifically, cellulose ester manufactured by a method described in JP-A 2005-281645 can be also preferably utilized.

In the case of acetyl cellulose, it is necessary to prolong the time of an acetylation reaction to increase an acetylation degree. However, when the reaction time is excessively long, decomposition will proceed simultaneously to cause such as cut off of a polymer chain and decomposition of an acetyl group, which leads to an unfavorable result.

Therefore, it is necessary to set the reaction time of a certain range to increase the acetylation degree and depress decomposition to some extent. To regulate by reaction time is not suitable because the reaction conditions are various to be changed depending on the reaction equipment and installation and other conditions. Since molecular weight distribution is broadened as decomposition of polymer proceeds, also in the case of cellulose ester, the degree of decomposition can be determined by a value of weight average molecular weight (Mw)/number average molecular weight (Mn), which is generally utilized.

That is, in a process of acetylation of cellulose triacetate, a value of weight average molecular weight (Mw)/number average molecular weight (Mn) can be utilized as one index not to advance decomposition too much due to prolonged reaction time but to perform acetylation reaction for sufficient time.

An example of a manufacturing method of cellulose ester will be shown below. Cotton linter of 100 weight parts as a cellulose starting material was crushed, being added with 40 weight parts of acetic acid, and the resulting system was subjected to a pre-treatment activation at 36° C. for 20 minutes. Thereafter, the system was added with 8 weight parts of sulfuric acid, 260 weight parts of acetic acid anhydride and 350 weight parts of acetic acid, and the resulting system was subjected to esterification at 36° C. for 120 minutes.

After neutralization with 11 weight parts of a 24% magnesium acetate aqueous solution, saponification ripening at 63° C. for 35 minutes was performed to prepare acetyl cellulose. The product, after having been stirred for 160 minutes at room temperature by use of 10 times of an acetic acid aqueous solution (acetic acid:water=1:1 (weight ratio)), was filtered and dried to prepare purified acetyl cellulose having an acetyl substitution degree of 2.75.

This acetyl cellulose had Mn of 92,000, Mw of 156,000 and Mw/Mn of 1.7.

In a similar manner, by adjusting esterification conditions (temperature, time/stirring) and hydrolysis conditions, cellulose ester having a different substitution degree and a different Mw/Mn can be synthesized.

Cellulose ester having a Mw/Mn ratio of 1.4 to 5.0 is preferably utilized.

Herein, cellulose ester synthesized is preferably subjected to purification to remove a low molecular weight component and to filtration to remove a component which has not been acetylated or has a low acetylation degree.

Further, mixed acid cellulose ester can be prepared by a method described in JP-A 10-45804.

Further, cellulose ester is also affected by trace amounts of metal components in cellulose ester. These are considered to be related with water utilized in a manufacturing process, and a component which forms insoluble nuclei is preferably as small as possible in quantity; and metal ions of such as iron, calcium and magnesium, which may form an insoluble product by salt formation with such as polymer decomposition product possibly containing an organic acid group, are preferably small in quantity.

An iron (Fe) component is preferably not more than 1 ppm. A calcium (Ca) component is easily form a coordination compound, that is a complex, with a acid component such as carboxylic acid and sulfonic acid as well as with many ligands, to form many insoluble scum (insoluble sediment, muddiness) derived from calcium.

A calcium (Ca) component is not more than 60 ppm and preferably 0 to 30 ppm. A magnesium (Mg) component is preferably 0 to 70 ppm and specifically preferably 0 to 20 ppm, since an excess amount thereof also generates an insoluble product Metal components such as a content of iron (Fe), calcium (Ca) and magnesium (Mg) can be analyzed by use of an ICP-AES (an induction coupling plasma emission spectrophotometer) after completely dried cellulose ester is subjected to pretreatment by a micro-digest wet decomposition apparatus (sulfuric nitric acid decomposition) and alkali fusion.

(Plasticizer)

The optical compensation film of this invention can be appropriately incorporated with a plasticizer to achieve the effects of this invention. A plasticizer is not specifically limited, however, is preferably selected from such as a polycarboxylic ester type plasticizer, a glycolate type plasticizer, a phthalic ester type plasticizer, a fatty acid ester type plasticizer, a polyhydric alcohol ester type plasticizer, a polyester type plasticizer and an acryl type plasticizer.

When not less than two types among them are utilized, at least one type is preferably a polyhydric alcohol ester type plasticizer.

A polyalcohol ester consists of an ester of an aliphatic polyalcohol having a valence of two or more and monocarboxylic acid, and preferably includes an aromatic ring or a cycloalkyl ring in a molecule.

A polyalcohol used in the present invention is represented by formula (a)

$$R_1\text{—}(OH)_n \quad \text{Formula (a)}$$

Wherein: $R_1$ represents an organic acid having a valence of n, n represents a positive integer of 2 or more and OH represents an alcoholic and/or a phenolic hydroxyl group.

Examples of a preferable polyalcohol are listed below, however, the present invention is not limited thereto: adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentanediol, 1,6-hexanediol, hexanetriol, galactitol, mannitol, 3-methylpentane-1,3,5-triol, pinacol, sorbitol, trimethylolpropane, trimethylolethane and xylitol. Specifically, triethylene glycol, tetraethylene glycol, dipropylene glycol, tripropylene glycol, sorbitol, trimethylolpropane and xylitol are preferable.

A mono carboxylic acid to be used for the polyalcohol ester is not specifically limited, and well known compounds such as aliphatic monocarboxylic acid, alicyclic monocarboxylic acid and aromatic monocarboxylic acid may be used. Alicyclic monocarboxylic acid or aromatic monocarboxylic acid is preferably used with respect to improving moisture permeability and retention of additives.

Examples of preferable monocarboxylic acids are listed below, however, the present invention is not limited thereto.

For aliphatic monocarboxylic acids, normal or branched fatty acids having from 1 to 32 carbon atoms are preferably used. The number of carbon atoms is more preferably from 1 to 20 and still more preferably from 1 to 10.

The use of an acetic acid will help improve the mutual solubility, so that a mixture of an acetic acid and other monocarboxylic acids is also preferable.

Examples of preferable aliphatic mono carboxylic acids include saturated fatty acids such as: acetic acid, propionic acid, butyric acid, valeric acid, caproic acid, enanthic acid, caprylic acid, pelargonic acid, capric acid, 2-ethyl-hexanoic acid, undecylic acid, lauric acid, tridecylic acid, myristic acid, pentadecylic acid, palmitic acid, heptadecanoic acid, stearic acid, nonadecane acid, arachidic acid, behenic acid, lignoceric acid, cerotinic acid, heptacosanoic acid, montanic acid, melissic acid, lacceric acid, as well as unsaturated fatty acids such as: undecylic acid, oleic acid, sorbic acid, linoleic acid, linolenic acid and arachidonic acid.

Examples of preferable alicyclic monocarboxylic acids include: cyclopentanecarboxylic acid, cyclohexanecarboxylic acid, cyclooctanecarboxylic acid, and derivatives thereof.

Examples of preferable aromatic monocarboxylic acids include: benzoic acid and toluic acid, both of which have benzene ring in which 1 to 3 of alkyl groups such as alkyl group, methoxy group and ethoxy group are introduced, biphenylcarboxylic acid, naphthalenecarboxylic and tetralincarboxylic acid having 2 or more benzene rings, and derivatives thereof. Among them, benzoic acid is specifically preferred.

The molecular weight of the polyalcohol ester is not limited, however, the molecular weight is preferably from 300 to 1,500 and more preferably from 350 to 750. A higher molecular weight is preferable in that the volatility of the polyalcohol is reduced, while a lower molecular weight is preferable with respect to moisture permeability, or to mutual solubility with cellulose ester.

To be used for a polyalcohol ester, carboxylic acid may be used alone or in combination of two or more carboxylic acids. Hydroxyl groups in a polyalcohol may be completely esterified or only partially esterified remaining unsubstituted hydroxyl groups.

Specific examples of polyalcohol esters are shown below.

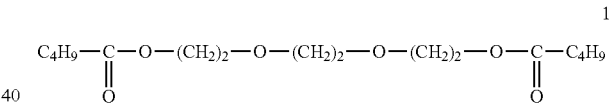

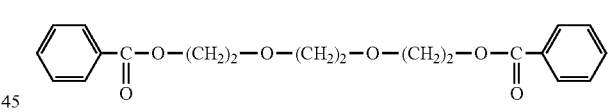

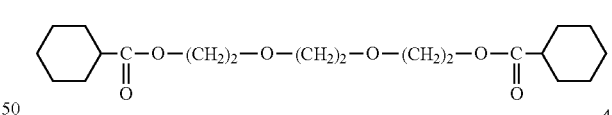

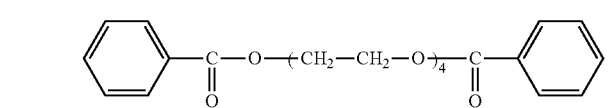

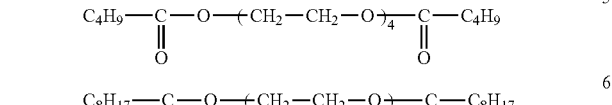

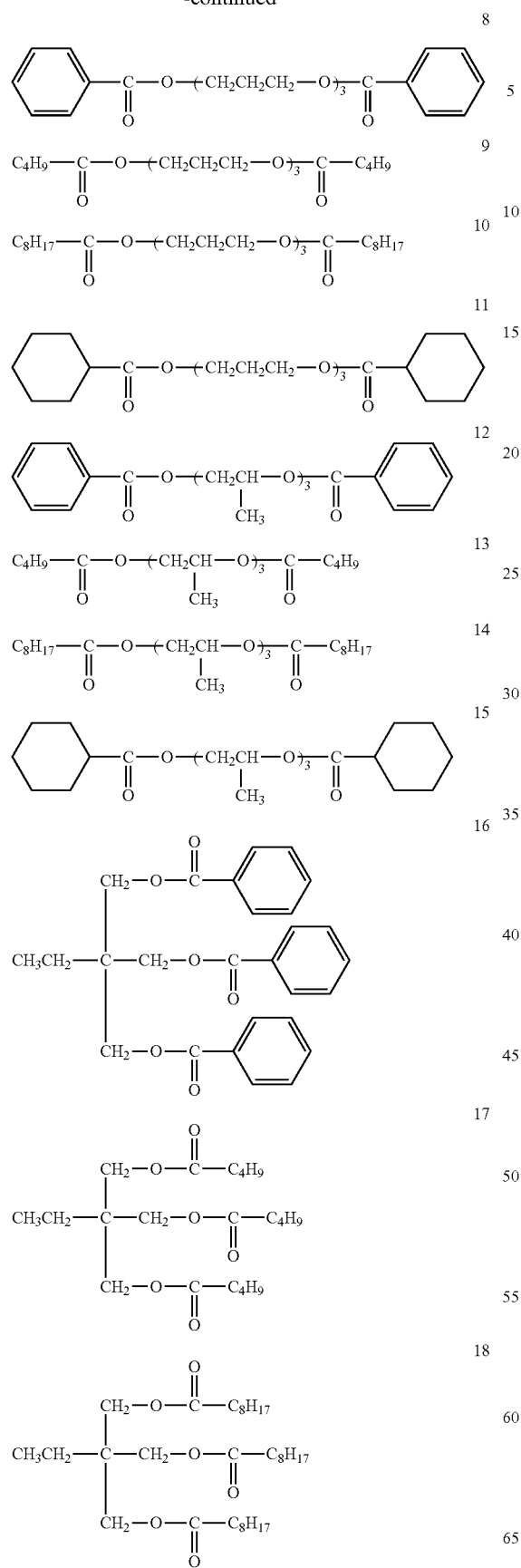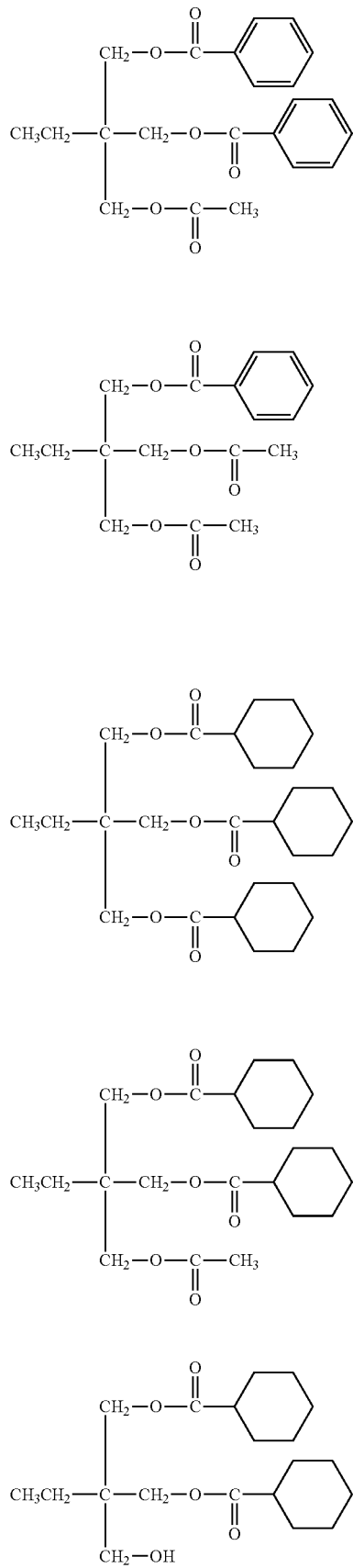

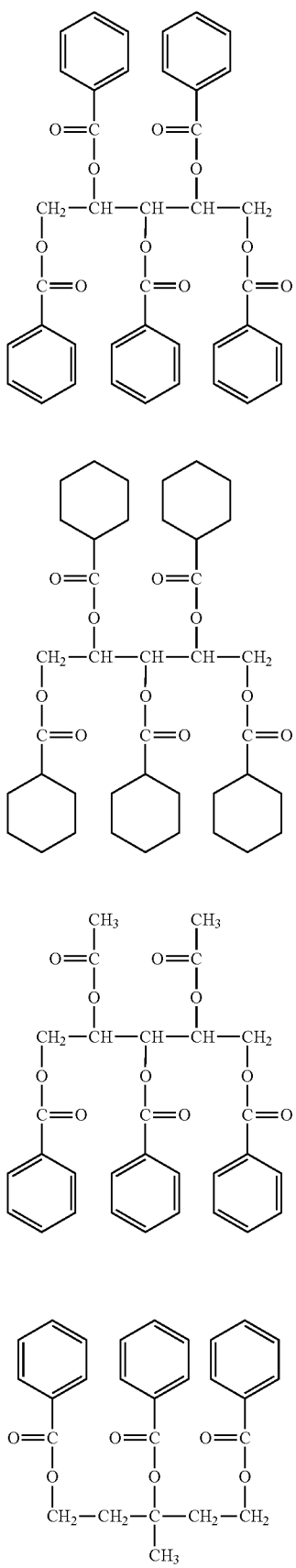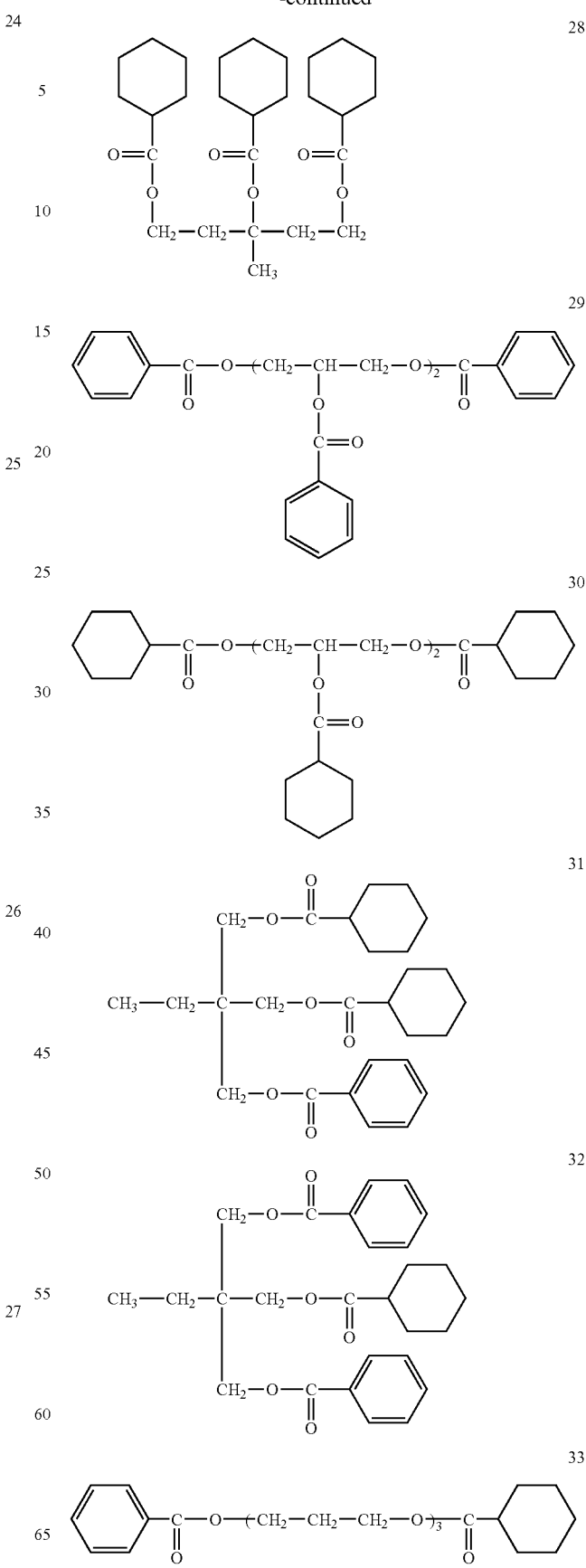

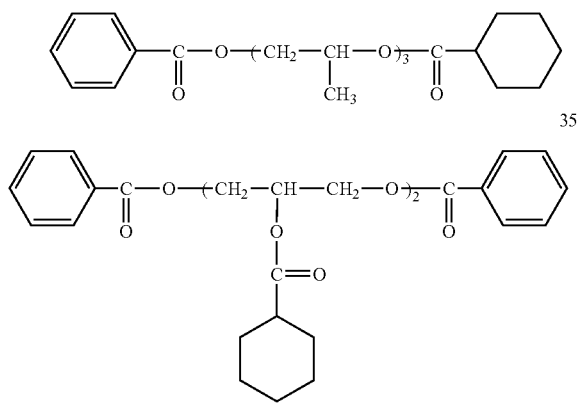

A glycolate type plasticizer is not specifically limited, however, alkylphthalylalkyl glycolates are preferably utilized. Alkylphthalylalkyl glycolates include such as methylphthalylmethyl glycolate, ethylphthalylethyl glycolate, propylphthalylpropyl glycolate, butylphthalylbutyl glycolate, octylphthalyloctyl glycolate, methylphthalylethyl glycolate, ethylphthalylmethyl glycolate, ethylphthalylpropyl glycolate, methylphthalylbutyl glycolate, ethylphthalylbutyl glycolate, butylphthalylmethyl glycolate, butylphthlylethyl glycolate, propylphthalylbutyl glycolate, butylphthalylpropyl glycolate, methylphthalyloctyl glycolate, ethylphthalyloctyl glycolate, octylphthalylmethyl glycolate and octylphthalylethyl glycolate.

A phthalate ester type plasticizer includes such as diethyl phthalate, dimethoxyethyl phthalate, dimethyl phthalate, dioctyl phthalate, dibutyl phthalate, di-2-ethylhexyl phthalate, dioctyl phthalate, dicyclohexyl phthalate and dicyclohexyl terephthalate.

A citric ester type plasticizer includes such as acetyltrimethyl citrate, acetyltriethyl citrate and acetyltributyl citrate.

A fatty acid ester type plasticizer includes such as butyl oleate, methylacetyl ricinoleate and dibutyl sebacate.

A phosphoric ester type plasticizer includes such as triphenyl phosphate, tricresyl phosphate, cresyldiphenyl phosphate, octyldiphenyl phosphate, diphenylbiphenyl phosphate, trioctyl phosphate and tributyl phosphate.

Polycarboxylic ester compound is comprised of ester of polycarboxylic acid of not less than 2 valences, preferably of 2-20 valences, and alcohol. Further, aliphatic polycarboxylic acid is preferably of 2-20 valences. In the case of aromatic polycarboxylic acid and alicyclic polycarboxylic acid, 3-20 valences are preferable.

Polycarboxylic acid is represented by following Formula (b).

 Formula (b)

(wherein, $R_2$ is an (m+n) valent organic group; m is an integer of not less than 2; n is an integer of not less than 0; COOH group is a carboxyl group; and OH group is an alcoholic or phenolic hydroxyl group.)

Examples of preferable polycarboxylic acid include the following, however, this invention is not limited thereto. Aromatic polycarboxylic acid of not less than 3 valences such as trimellitic acid, trimesic acid and pyromellitic acid, and derivatives thereof; aliphatic polycarboxylic acid such as succinic acid, adipic acid, azelaic acid, sebasic acid, oxalic acid, fumaric acid, maleic acid and tetrahydrophthalic acid; oxypolycarboxylic acid such as tartaric acid, tartronic acid, malic acid and oxalic acid; can be preferably utilized. It is specifically preferable to utilize oxypolycarboxylic acid with respect to such as improvement of reservability.

Alcohol utilized in a polycarboxylic ester compound, which can be utilized in this invention, is not specifically limited and alcohols and phenols well known in the art can be utilized. For example, straight chain or branched aliphatic saturated alcohol or aliphatic unsaturated alcohol, having a carbon number of 1-32, can be preferably utilized.

As an alcohol, the carbon number is more preferably 1 to 20 and specifically preferably 1 to 10. Further, such as alicyclic alcohol such as cyclopentanol and cyclohexanol or derivatives thereof, and aromatic alcohol such as benzyl alcohol and cinnamyl alcohol or derivatives thereof can be also preferably utilized.

When oxypolycarboxylic acid as polyvalent carboxylic acid is utilized, an alcoholic or phenolic hydroxyl group of polycarboxylic acid may be esterified by use of monocarboxylic acid. Preferable monocarboxylic acid includes the following; however, this invention is not limited thereto.

As aliphatic monocarboxylic acid, straight chain or branched fatty acid having a carbon number of 1 to 32 is preferably utilized. The carbon number is more preferably 1 to 20 and specifically preferably 1 to 10.

Preferable aliphatic monocarboxylic acid includes saturated fatty acid such as acetic acid, propionic acid, butyric acid, valeric acid, caproic acid, enanthic acid, caprylic acid, pelargonic acid, capric acid, 2-ethyl-hexane carboxylic acid, undecylic acid, lauric acid, tridecylic acid, myristic acid, pentadecylic acid, heptadecylic acid, stearic acid, nonadecanoic acid, arachic acid, behenic acid, lignoceric acid, cerotic acid, heptacosanoic acid, montanic acid, melissic acid and lacceric acid; and unsaturated fatty acid such as undecylenoic acid, oleic acid, sorbic acid, linoleic acid, linolenic acid and arachidic acid.

Examples of preferable alicyclic monocarboxylic acid include cyclopentane carboxylic acid, cyclohexane carboxylic acid and cyclooctane carboxylic acid; or derivatives thereof.

Examples of preferable aromatic monocarboxylic acid include those in which an alkyl group is introduced in a benzene ring of benzoic acid such as benzoic acid and toluic acid; aromatic monocarboxylic acid having at least two benzene rings such as biphenyl carboxylic acid, naphthaline carboxylic acid and tetraline carboxylic acid, or derivatives thereof. Acetic acid, propionic acid and benzoic acid are specifically preferable.

The molecular weight of a monocarboxylic ester compound is not specifically limited, however, is preferably in a range of 300 to 1,000 and more preferably in a range of 350 to 750. The molecular weight is preferably the larger with respect to reservability, while it is preferably smaller with respect to moisture permeability and compatibility with cellulose ester.

Alcohols, which is utilized in polycarboxylic ester applicable in this invention, may be either one type or a mixture of at least two types.

An acid value of a polycarboxylic ester compound utilizable in this invention is preferably not more than 1 mg KOH/g and more preferably not more than 0.2 mg KOH/g. By setting the acid value within the above-described range, variation of retardation due to environment is preferably suppressed.

(Acid Value)

An acid value refers to a milligram value of potassium hydroxide required to neutralize acid contained in 1 g of a sample (carboxyl groups existing in a sample). An acid value is measured based on JIS K0070.

Specifically preferable examples of a polycarboxylic ester compound will be shown below, however, this invention is not limited thereto. For example, listed are triethyl citrate, tributyl citrate, acetyltriethyl citrate (ATEC), acetyltributyl citrate (ATBC), benzoyltributyl citrate, acetyltriphenyl citrate, acetyltribenzyl citrate, dibutyl tartrate, diacetyldibutyl tartrate, tributyl trimellitate and tetrabutyl pyromellitate.

A polyester type plasticizer is not specifically limited, however, a polyester type plasticizer having an aromatic ring or a cycloalkyl ring in a molecule can be utilized. A polyester type plasticizer is not specifically limited, however, such as an aromatic terminal ester type plasticizer represented by following Formula (c) can be utilized.

$$B\text{-}(G\text{-}A)_n\text{-}G\text{-}B \quad \text{Formula (c)}$$

(wherein, B is a benzene monocarboxylic acid residual group; G is an alkylene glycol residual group having a carbon number of 2-12, an aryl glycol residual group having a carbon number of 6-12, or an oxyalkylene glycol residual group having a carbon number of 4-12; A is an alkylene dicarboxylic acid residual group having a carbon number of 4-12 or an aryl dicarboxylic acid residual group having a carbon number of 6-12; and n is an integer of not less than 1.)

A compound represented by Formula (c) is comprised of benzene monocarboxylic acid residual group represented by B, an alkylene glycol residual group, an oxyalkylene glycol residual group or an arylglycol residual group represented by G, and an alkylen dicarboxylic acid residual group or an aryl dicarboxylic acid residual group represented by A; and can be prepared by a reaction similar to that of a general polyester type plasticizer.

A benzene monocarboxylic acid component of polyester type plasticizer utilized in this invention includes such as benzoic acid, p-tertiary-butylbenzoic acid, ortho-toluic acid, metha-toluic acid, para-toluic acid, dimethylbenzoic acid, ethylbenzoic acid, n-propylbenzoic acid, aminobenzoic acid and acetoxybenzoic acid, and these each may be utilized alone or as a mixture of not less than two types.

An alkylene glycol component having a carbon number of 2-12, which can be utilized in this invention, includes such as ethylene glycol, 1,2-propylene glycol, 1,3-propylene glycol, 1,2-butanediol, 1,3-butanediol, 1,2-propanediol, 2-methyl-1,3-propanediol, 1,4-butanediol, 1,5-pentanediol, 2,2-dimethyl-1,3-propanediol (neopentyl glycol), 2,2-diethyl-1,3-propanediol (3,3-dimethylol pentane), 2-n-butyl-2-ethyl-1,3-propanediol (3,3-dimethylol heptane), 3-methyl-1,5-pentanediol, 1,6-hexanediol, 2,2,4-trimethyl-1,3-pentanediol, 2-ethyl-1,3-hexanediol, 2-methyl-1,8-octanediol, 1,9-nonanediol, 1,10-decanediol and 1,12-octadecanediol; and these glycols are utilized alone or as a mixture of at least two types. An alkylene glycol having a carbon number of 2-12 is specifically preferable because of excellent compatibility with cellulose ester.

Further, an oxyalkylene glycol component, having a carbon number of 4-12, of the above-described aromatic terminal ester includes such as diethylene glycol, triethylene glycol, tetraethylene glycol, dipropylene glycol and tripropylene glycol; and these glycols can be utilized alone or as a mixture of at least two types.

An alkylene dicarboxylic acid component, having a carbon number of 4-12, of aromatic terminal ester includes such as maleic acid, fumaric acid, glutaric acid, adipic acid, azereic acid, cebasic acid and dodecane dicarboxylic acid; and these may be utilized alone or as a mixture of not less than two types. An arylene dicarboylic acid component having a carbon number of 6-12 is phythalic acid, terephthalic acid, isophthalic acid, 1,5-naphthalene dicarboxylic acid and 1,4-naphthalene dicarboxylic acid.

A polyester type plasticizer utilized in this invention preferably has a number average molecular weight in a range of 300 to 1,500 and more preferably of 400 to 1,000. Further, an acid value thereof is 0.5 mg KOH/g or less and a hydroxyl group value is 25 mg KOH/g or less; and more preferably the acid value is 0.3 mg KOH/g or less and the hydroxyl group value is 15 mg KOH/g or less.

In the following, synthesis examples of an aromatic terminal ester type plasticizer utilizable in this invention will be shown.

<Sample No. 1 (Aromatic Terminal Ester Sample)>

In a reaction vessel which was attached with a reflux condenser, 410 parts of phthalic acid, 610 parts of benzoic acid, 737 parts of dipropylene glycol and 0.40 parts of tetraisopropyl titanate as a catalyst were charged together, and the system was kept heated at 130 to 250° C. to continuously remove the generated water while excess monohydric alcohol was refluxed with stirring in nitrogen gas flow. Next, the distillate was removed at 200 to 230° C. under a reduced pressure of not higher than $1.33 \times 10^4$ Pa and finally of not higher than $4 \times 10^2$ Pa, followed by being filtered to prepare an aromatic terminal ester type plasticizer having the following characteristics.

Viscosity (25° C., mPa·s); 43,400

Acid value; 0.2

<Sample No. 2 (Aromatic Terminal Ester Sample)>

An aromatic terminal ester type plasticizer having the following characteristics was prepared in an exactly similar manner to sample No. 1, except that phthalic acid of 410 parts, 610 parts of benzoic acid, 341 parts of ethylene glycol and 0.35 parts of tetraisopropyl titanate as a catalyst were utilized.

Viscosity (25° C., mPa·s); 31,000

Acid value; 0.1

<Sample No. 3 (Aromatic Terminal Ester Sample)>

An aromatic terminal ester type plasticizer having the following characteristics was prepared in an exactly similar manner to sample No. 1, except that phthalic acid of 410 parts, 610 parts of benzoic acid, 418 parts of 1,2-propanediol and 0.35 parts of tetraisopropyl titanate as a catalyst were utilized.

Viscosity (25° C., mPa·s); 38,000

Acid value; 0.05

<Sample No. 4 (Aromatic Terminal Ester Sample)>

An aromatic terminal ester type plasticizer having the following characteristics was prepared in an exactly similar manner to sample No. 1, except that phthalic acid of 410 parts, 610 parts of benzoic acid, 418 parts of 1,3-propanediol and 0.35 parts of tetraisopropyl titanate as a catalyst were utilized.

Viscosity (25° C., mPa·s); 37,000

Acid value; 0.05

In the following, specific examples of an aromatic terminal ester type plasticizer utilizable in this invention will be shown; however, this invention is not limited thereto.

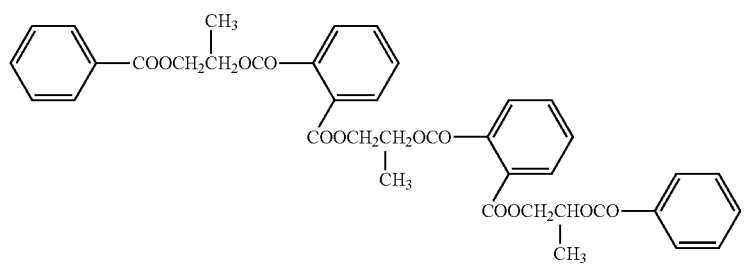
(1) Mw: 696
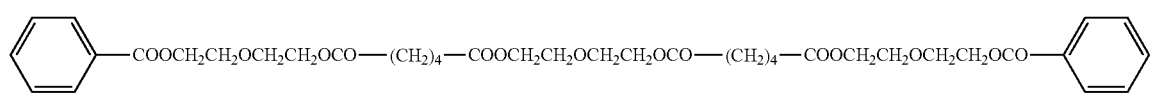
(2) Mw: 746
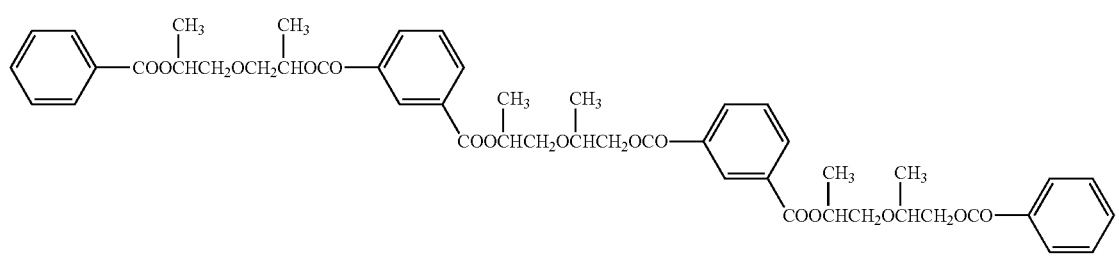
(3) Mw: 830
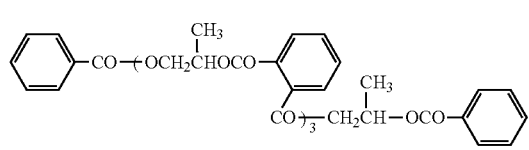
(4) Mw: 886
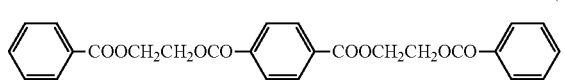
(5) Mw: 462
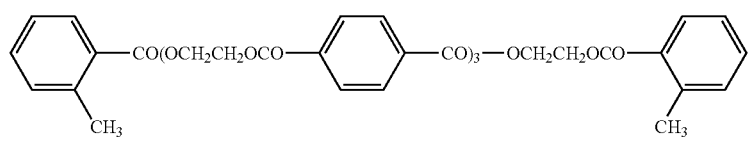
(6) Mw: 874
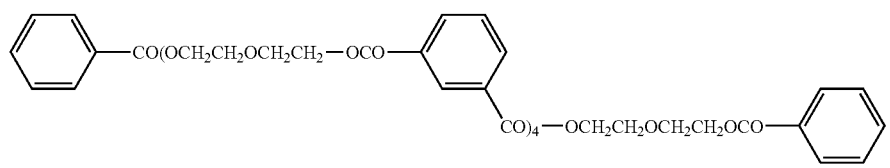
(7) Mw: 1258
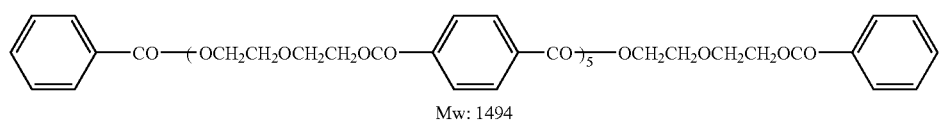
(8) Mw: 1494
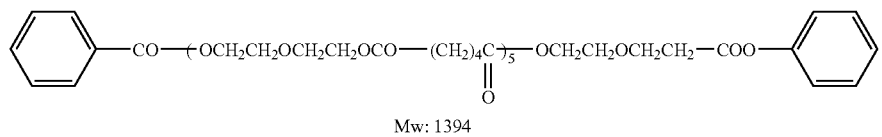
(9) Mw: 1394

-continued

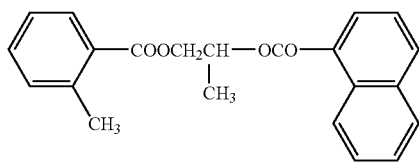 (10)

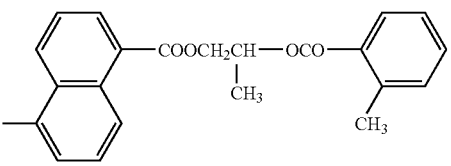

Mw: 852

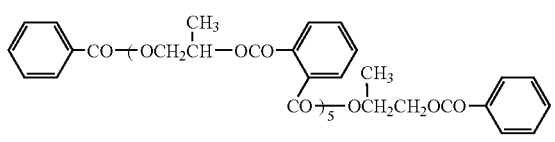 (11)

Mw: 1314

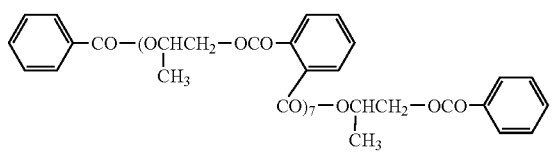 (12)

Mw: 1726

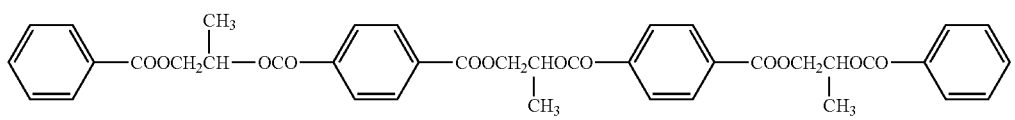 (13)

Mw: 696

(Ultraviolet Absorbent)

The optical compensation film according to this invention can also incorporate an ultraviolet absorbent. An ultraviolet absorbent has an object to improve durability by absorbing ultraviolet rays of not longer than 400 nm, and in particular, transmittance at a wavelength of 370 nm is preferably not more than 10%, more preferably not more than 5% and still more preferably not more than 2%.

An ultraviolet absorbent utilized in this invention is not specifically limited, however, includes such as an oxybenzophenone type compound, a benzotriazole type compounds a salicylic ester type compound, a benzophenone type compound, a cyano acrylate type compound, a triazine type compound, a nickel complex type compound and inorganic powder.

For example listed are 5-chloro-2-(3,5-di-sec-butyl-2-hydroxylphenyl)-2H-benzotriazole, (2-2H-benzotriazole-2-yl)-6-(straight chain and branched dodecyl)-4-methylphenol, 2-hydroxy-4-benzyloxybenzophenone and 2,4-benzyloxybenzophenone; and also listed and preferably utilized are Tinuvins, such as Tinuvin 109, Tinuvin 171, Tinuvin 234, Tinuvin 326, Tinuvin 327 and Tinuvin 328, which are available on the market from Ciba Specialty Chemicals.

Ultraviolet absorbents utilized in this invention are preferably a benzotriazole type ultraviolet absorbent, a benzophenone type ultraviolet absorbent and a triazine type ultraviolet absorbent, and specifically preferably a benzotriazole type ultraviolet absorbent and a benzophenone type ultraviolet absorbent.

For example, as a benzotriazole type ultraviolet absorbent, a compound represented by following Formula (d) can be utilized.

Formula (d)

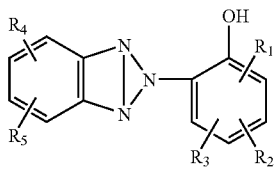

In the formula, $R_1$, $R_2$, $R_3$, $R_4$ and $R_5$, which may be same or different, are a hydrogen atom, a halogen atom, a nitro group, a hydroxyl group, an alkyl group, an alkenyl group, an aryl group, an alkoxy group, an acyloxy group, an aryloxy group, an alkyltho group, an arylthio group, mono- or di-alkylamino group, an acylamino group or a 5-6 member heterocyclic group; and $R_4$ and $R_5$ may perform ring closure to form a 5-6 member carbon ring.

Further, these groups described above may be provided with a substituent.

In the following, specific examples of a benzotriazole type ultraviolet absorbent utilized in this invention will be listed; however, this invention is not limited thereto.

UV-1: 2-(2'-hydroxy-5'-methylphenyl)benzotriazole

UV-2: 2-(2'-hydroxy-3',5'-di-tert-butylphenyl)benzotriazole

UV-3: 2-(2'-hydroxy-3'-tert-butyl-5'-methylphenyl)benzotriazole

UV-4: 2-(2'-hydroxy-3',5'-di-tert-butylphenyl)chlorobenzotriazole

UV-5: 2-(2'-hydroxy-3'-(3",4",5",6"-tetrahydrophthalimidomethyl)-5"-methylphenyl)benzotriazole UV-6: 2,2-methylenebis-(4-(1,1,3,3-tetramethylbutyl)-6-(2H-benzotriazole-2-yl)phenol)

UV-7: 2-(2'-hydroxy-3'-di-tert-butyl-5'-methylphenyl)-5-chlorobenzotriazole

UV-8: 2-(2H-benzotriazole-2-yl)-6-(straight chain and branched dodecyl)-4-methylphenol (Trade name: Tinavin 171)

UV-9; A mixture of octyl-3-[3-tert-butyl-4-hydroxy-5-chloro-2H-benzotriazole-2-yl)phenyl]propionate and 2-ethylhexyl-3-[3-tert-butyl-4-hydroxy-5-(5-chloro-2H benzotriazole-2-yl)phenyl]propionate (Trade name: Tinuvin 109)

Further, a compound represented by following Formula (e) is preferably utilized as a benzophenone type ultraviolet absorbent.

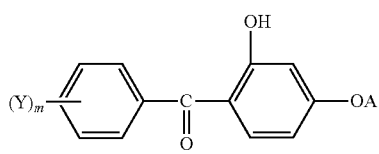

Formula (e)

In the formula, Y is a hydrogen atom, a halogen atom, an alkenyl group, an alkoxy group and a phenyl group; and these alkenyl group, alkenyl group and phenyl group may be provided with a substituent. A is a hydrogen atom, an alkyl group, an alkenyl group, a phenyl group, a cycloalkyl group, an alkylcarbonyl group, an alkylsulfonyl group or —CO(NH)$_{n-1}$-D group; and D is an alkyl group, an alkenyl group or a phenyl group which may be provided with a substituent. m and n are 1 or 2.

In the above description, an alkyl group is, for example, a straight chain or branched aliphatic group having a carbon number of up to 24; an alkoxy group is, for example, an alkoxy group having a carbon number of up to 18; and an alkenyl group is, for example, an alkenyl group having a carbon number of up to 16 such as an allyl group and a 2-butenyl group.

Further, a substituent to an alkyl group, an alkenyl group and a phenyl group includes such as a halogen atom (such as a chlorine atom, a bromine atom and a fluorine atom), a hydroxyl group and a phenyl group (this phenyl group may be substituted by such as an alkyl group or a halogen atom).

In the following, specific examples of a benzophenone type ultraviolet absorbent represented by Formula (e), however, this invention is not limited thereto.

UV-10: 2,4-dihydroxybenzophenone
UV-11: 2,2'-dihydroxy-4-methoxybenzophenone
UV-12: 2-hydroxy-4-methoxy-5-sulfobenzophenone
UV-13: bis(2-methoxy-4-hydroxy-5-benzoylphenyl-methane)

In addition to these, a disc form compound such as a compound having a 1,3,5-triazine ring is preferably utilized.

The polarizing plate protective film according to this invention preferably contains more than two types of ultraviolet absorbents.

Further, a polymer ultraviolet absorbent may also be preferably utilized as an ultraviolet absorbent, and polymer type ultraviolet absorbents described in JP-A 6-148430 are specifically preferably utilized.

As an addition method of an ultraviolet absorbent, an ultraviolet absorbent may be added into a dope after having been dissolved in an organic solvent such as alcohol like methanol, ethanol and butanol, methylenechloride, methyl acetate, acetone and dioxane; or may be directly added into a dope composition. Those insoluble in an organic solvent, such as inorganic powder, will be added into a dope after having been dispersed in an organic solvent and cellulose ester by use of such as a dissolver or a sand mill.

The using amount of an ultraviolet absorbent is not uniform depending on a type and a using condition of an ultraviolet absorbent, however, in the case of the dry layer thickness of polarizing plate protective film of 30 to 200 µm, it is preferably 0.5 to 10 weight % and more preferably 0.6 to 4 weight %, against polarizing plate protective film.

(Antioxidant)

An antioxidant is also called antidegradant. When a liquid crystal image display device etc. is placed in the state of high humidity high temperature, deterioration of a optical compensation film may occur. Since, for example, an antioxidant has a function which delays or prevents a optical compensation film from decompositioning by halogen in residual solvents in the optical compensation film, or by phosphoric acid of a phosphoric acid type plasticizer, etc., it is desirable to make it contain in the above-mentioned optical compensation film.

As such an antioxidant, a hindered-phenol type compound is used preferably. For example, 2,6-di-t-butyl-p-cresol, a penta ERIS retail-tetrakis[3-(3,5-di-t-butyl-4 hydroxyphenyl) propionate], triethylene glycol-bis[3-(3-t-butyl-5-methyl-4 hydroxyphenyl) propionate], 1,6-dihydroxyhexane-bis[3(3,5-di-t-butyl-4 hydroxyphenyl) propionate], 2 and 4-bis-(n-octylthio)-6-(4-hydroxy-3,5-di-t-butyl anilino)-1,3, and 5-triazine, 2 and 2-chio-diethylenebis [3-(3,5-di-t-butyl-4 hydroxyphenyl) propionate], octadecyl-3-(3,5-di-t-butyl-4 hydroxyphenyl) propionate, N and N' hexamethylene bis(3,5-di-t-butyl-4-hydroxy-hydrocinnamide), 1,3, and 5-trimethyl-2,4,6-tris(3,5-di-t-butyl-4-hydroxy benzyl)benzene, tris-(3,5-di-t-butyl-4-hydroxy benzyl)-isocyanurate, etc. may be listed. In particular, 2,6-di-t-butyl-p-cresol, a penta erisretil-tetrakis[3-(3,5-di-t-butyl-4 hydroxyphenyl) propionate], and a triethylene glycol-bis 1[3-(3-t-butyl-5-methyl-4 hydroxyphenyl) propionate] are desirable. Moreover, for example, phosphorus type processing stabilizers, such as metal deactivator of hydrazine types, such as an N and N'-bis [3-(3,5-di-t-butyl-4 hydroxyphenyl) propionyl]hydrazine, and tris(2,4-di-t-butylphenyl) phosphight may be used together.

As an added amount of these compound, an added amount of 1 ppm to 1.0% at a mass rate to a cellulose derivative is desirable, and 10-1000 ppm are still more desirable.

(Fine Particles)

The optical compensation film according to this invention preferably contains fine particles.

As inorganic fine particles utilized in this invention, examples of an inorganic compound include silicon dioxide, titanium dioxide, aluminum oxide, zirconium oxide, calcium carbonate, talc, clay, burned kaolin, burned calcium silicate, hydrated calcium silicate, aluminum silicate, magnesium silicate and calcium phosphate. Fine particle are preferably those containing silicon because turbidity is decreased and silicon dioxide is specifically preferred.

The mean particle size of a primary particle of fine particle is preferably 5 to 400 nm and more preferably 10-300 nm. These may be contained as secondary aggregate having a particle size of 0.05 to 0.3 µm, or may be contained as primary particles without aggregation in the case of particles having an average particle size of 100 to 400 nm. The content of these fine particle in polarizing plate protective film is preferably 0.01 to 1 weight % and specifically preferably 0.05 to 0.5 weight %. In the case of a polarizing plate protective film comprising a constitution of plural layers by a co-casting method, fine particle of this addition amount are preferably incorporated in the surface.

As fine particle of silicon dioxide, for example, products under the names of Aerosil R972, R972V, R974, R812, 200, 200V, 300, R202, OX50 and TT600 (produced by Nippon Aerosil Co., Ltd.) are available on the market and can be utilized.

As fine particle of zirconium oxide, for example, products under the names of Aerosil R976 and R811 (produced by Nippon Aerosil Co., Ltd.) are available on the market and can be utilized.

Examples of polymer include silicone resin, fluorine-containing resin and acrylic resin. Silicone resin is preferred and those, having a three dimensional net structure, are specifically preferable; for example, products under the name of Tospearl 103, 105, 108, 120, 145, 3120 and 240 (produced by Toshiba Silicones Co., Ltd.) are available on the market and can be utilized.

Among these, Aerosil 200V and Aerosil R972 are specifically preferably utilized because of a large effect to decrease a friction coefficient while keeping turbidity of polarizing plate protective film to be low. In polarizing plate protective film utilized in this invention, a dynamic friction coefficient of at least one of the surfaces is preferably 0.2 to 1.0.

Various types of additives may be batch-wise added into a dope as a cellulose ester containing solution before casting, or may be inline-wise added by preparing a solution of dissolved additives. In particular, a part of or the total amount of fine particle are preferably added by an inline method to reduce a load on a filter medium.

In the case of addition of an additive solution is performed by an inline method, it is preferable to dissolve a small amount of cellulose ester in the solution to increase compatibility with a dope. The preferable amount of cellulose ester is 1 to 10 weight parts and more preferably 3 to 5 weight parts against 100 parts of a solvent.

To perform inline addition and mixing in this invention, for example, an inline mixer such as Static Mixer (manufactured by Toray Engineering Corp.) and SWJ (Toray Static Inline Mixer, Hi-Mlxer) is preferably utilized.

(Manufacturing Method of Optical Compensation Film)

Next, a manufacturing method of optical compensation film of this invention will be explained.

As optical compensation film according to this invention, either of film manufactured by a solution casting method or film manufactured by a melt casting method can be preferably utilized.

Manufacturing of optical compensation film of this invention is performed by a process to dissolve cellulose ester and additives in a solvent to prepare a dope, a process to cast the dope on an infinitely transferring endless metal support, a process to dry the cast dope to make a web, a process to peel off the web from a metal support, a process to stretch the web or to hold the width, a process to further dry the web, and a process to wind up the finished film.

A process to prepare a dope will be now described. The concentration of cellulose in a dope is preferably the higher with respect to decreasing a drying load after the dope has been cast on a metal support, while, when the concentration of cellulose ester is excessively high, filtering precision will be deteriorated due to an increased load at the time of filtering. The concentration to balance these is preferably 10 to 35 weight % and more preferably 15 to 25 weight %.

A solvent utilized in a dope of this invention, one type alone or at least two types in combination may be utilized, however, a good solvent and a poor solvent of cellulose ester are preferably utilized in combination with respect to manufacturing efficiency.

A preferable range of a mixing ratio of a good solvent to a poor solvent is 70 to 98 weights of good solvent to 2 to 30 weight % of a poor solvent. As a good solvent and a poor solvent, one dissolves cellulose ester, which is utilized, by itself alone is defined as a good solvent and one swells or cannot dissolve cellulose ester is defined as a poor solvent.

Therefore, a good solvent and a poor solvent may differ depending on an average acetylation degree (an acetyl substitution degree), and for example, when acetone is utilized as a solvent, it becomes a good solvent for acetic ester of cellulose (an acetyl substitution degree of 2.4) and cellulose acetate propionate, while it becomes a poor solvent for acetic ester of cellulose (an acetyl substitution degree of 2.8) of cellulose.

A good solvent utilized in this invention is not specifically limited, however, includes an organic halogen compound such as methylene chloride, dioxoranes, acetone, methylacetate and methyl acetoacetate. Methylene chloride and methyl acetate are specifically preferable.

Further, a poor solvent utilized in this invention is not specifically limited, however, such as methanol, ethanol, n-butanol, cyclohexane and cyclohexanone are preferably utilized. Further, a dope is preferably contains 0.01 to 2 weight % of water.

Further, as a solvent utilized for dissolution of cellulose ester, a solvent removed from film by drying in a film casting process is recovered and reused. In a recovered solvent, a trace amount of additives such as a plasticizer, an ultraviolet absorbent, polymer or monomer components may be contained, however, the solvent may be utilized even containing them or may be utilized appropriately after purification.

As a dissolution method of cellulose ester at the time of preparation of the dope described above, a general method can be employed. By combination of heating and increased pressure, it is possible to heat up to higher than a boiling point at an ordinary pressure.

It is preferable because generation of a granular insoluble residue, which is called as gel or flocculates, is inhibited, when cellulose ester is dissolved with stirring while being heated at a temperature in a range of not lower than a boiling point under ordinary pressure and not to boil the solvent under increased pressure. Further, preferably utilized is a method, in which cellulose ester is dissolved by further adding a good solvent after having been wetted or swelled by mixing with a poor solvent.

Pressure increase may be performed by a method to introduce an inert gas such as a nitrogen gas or a method to increase vapor pressure of a solvent by heating. Heating is preferably performed from outside and, for example, a jacket type equipment is preferable with respect to easy temperature control.

Heating temperature with addition of a solvent is preferably the higher in view of solubility of cellulose ester, however, productivity may be deteriorated due to increase of a required pressure when the heating temperature is excessively high. The heating temperature is preferably 45 to 120° C., more preferably 60 to 110° C. and still more preferably 70 to 105° C. Further, pressure is adjusted not to boil a solvent at the set temperature.

In addition to these, a cold dissolution method is also preferably applied, and cellulose ester can be dissolved in such as methyl acetate by this method.

Next, this cellulose ester solution is filtered by use of a suitable filter medium such as filter paper. As a filter medium, the absolute filtering precision is preferably the smaller to eliminate insoluble residue, however, there is a problem of easy clogging of a filter medium when the absolute filtering precision is excessively small.

Therefore, the absolute filtering precision of a filter medium is preferably not larger than 0.008 mm, more preferably 0.001 to 0.008 mm and furthermore preferably 0.003 to 0.006 mm.

The material of a filter medium is not specifically limited and an ordinary filter medium can be utilized, however, a filter medium made of plastic such as polypropylene and Teflon (a registered trade mark) and a filter medium made of metal such as stainless steel are preferable because of such as no release of fiber of a filter medium. It is preferable to eliminate and reduce particularly impurities and foreign materials causing a bright spot defect having been contained in cellulose ester as a raw material by filtration.

Foreign materials causing bright spot defects means a spot (a foreign material) which is visible due to light leak, when two sheets of polarizing plates, between which an optical film is placed, are arranged in a crossed nicols state, and light is irradiated from one of the polarizing plate side to be observed from the other polarizing plate side. The number of bright spots having a diameter of not less than 0.01 mm is preferably 200 spots/cm$^2$ or less, more preferably 100 spots/cm$^2$ or less, furthermore preferably 50 spots/cm$^2$ or less, and most preferably 0-10 sport/cm$^2$. Further, the smaller, the number of bright spots of 0.01 mm or less is, the more, it is also preferable.

Filtering of a dope can be performed by an ordinary method, however, a method to filter while heating at a temperature of not lower than a boiling point of a solvent at ordinary pressure and of not to boil the solvent under an increased pressure is preferable because of small increase of a difference of filter pressures before and after filtering (referred to as a pressure difference). The preferable temperature is 45 to 120° C., more preferably 45 to 70° C. and furthermore preferably 45 to 55° C.

Filter pressure is preferably the lower. The filter pressure is preferably not higher than 1.6 MPa, more preferably not higher than 1.2 MPa and furthermore preferably not higher than 1.0 MPa.

Casting of a dope will now be explained.

A metal support in a casting process is preferably those the surface of which is mirror finished, and a stainless steel belt or a drum made of castings, the surface of which is mirror finished, is utilized. The cast width can be set to 1 to 4 m.

The surface temperature of a metal support in a cast process is from −50° C. to lower than a boiling point of a solvent and it is preferable the temperature is the higher since web drying speed is fast; however, excessively high temperature may sometimes cause foaming of a web or deterioration of flatness.

The support temperature is preferably 0 to 40° C. and more preferably 5 to 30° C. It is also a preferable method to make a web gelled by cooling and to peel off the web from a drum with a plenty of residual solvent contained.

A method to control the temperature of a metal support is not specifically limited, however, there are a method to blow a hot wind or a cold wind on the web and a method to make hot water contact the rear side of a metal plate. A method to utilize hot water is preferable because time required to make a metal support become a constant temperature is short due to more efficient heat transfer by use of a hot water. In the case of employing a hot wind, a wind of a temperature higher than the aimed temperature may be employed.

To provide a good flatness of optical compensation film, the residual solvent amount at the time of peeling off a web from a metal support is preferably 10 to 150 weight %, more preferably 20 to 40 weight % or 60 to 130 weights and specifically preferably 20 to 30 weight % or 70 to 120 weight %.

In this invention, a residual solvent amount is defined by the following equation.

Residual solvent amount (weight %)={(M−N)/N}×100

Herein, M is a weight of a sample picked at an arbitrary time during or after manufacturing of a web or film and N is a weight after heating at 115° C. for 1 hour.

Further, in a drying process of optical compensation film, a web is preferably peeled off from a metal support and further dried to make a residual solvent amount of not more than 1 weight %, more preferably not more than 0.1 weight % and specifically preferably 0 to 0.01 weight %.

In a film drying process, a roll drying method (in which a web is dried while being alternately passed through many rolls which are arranged up and down) or a method to dry a web while being transported by a tenter method will be applied.

To prepare optical compensation film of this invention, it is specifically preferable that a web is stretched in the width direction by means of a tenter method to grip the both edges of the web by such as clips. It is preferable to peel off at a peel-off tension of not less than 300 N/m.

A means to dry a web is not specifically limited, and it can be generally performed by such as a hot wind, ultraviolet rays, a heat roll and microwaves, however, preferably performed by a hot wind with respect to convenience.

Drying temperature in a drying process of a web is preferably 40 to 200° C. and stepwise raised.

The layer thickness of optical compensation film is not specifically limited; however, a layer thickness of 10 to 200 μm is applied. The layer thickness is specifically preferably 10-100 μm and furthermore preferably 20 to 60 μm.

Optical compensation film of this invention has a width of 1 to 4 m. The width is preferably 1.4 to 4 m and specifically preferably 1.6 to 3 m. When the width exceeds 4 m, the transportation becomes difficult.

(Stretching Operation, Refractive Index Control)

The optical compensation film preferably has retardation values Ro and Rt which satisfy the following Formulas (A-1) to (A-3).

$$20 \leq Ro \leq 100 \text{ (nm)} \quad \text{(A-1)}$$

$$70 \leq Rt \leq 200 \text{ (nm)} \quad \text{(A-2)}$$

$$0.82 \leq Ro(480)/Ro(630) \leq 0.95 \quad \text{(A-3)}$$

Here, $$Ro = (nx - ny) \times d$$

$$Rt = ((nx + ny)/2 - nz) \times d$$

(In these formulas, nx represents a refractive index in a slow axis direction in a plane of the optical compensation film, ny represents a refractive index in a direction perpendicular to the slow axis in a plane, nz represents a refractive index in a thickness direction and d represents the thickness (nm) of the optical compensation film respectively. The measuring wavelength for the refractive index is 590 nm Ro (480) and Ro (630) represent Ro measured with the wavelength of 480 nm and Ro measured with the wavelength of 630 nm, respectively).

The above-described refractive index can be determined by the use of, for example, KOBRA-21ADH (manufactured by Oji Instrument Co., Ltd.) at a wavelength of 590 nm under an environment of 23° C. and 55% RH.

It becomes possible to adjust not only a desired retardation but also a wavelength dispersion characteristic by combining a (meth)acrylic polymer of the present invention and a compound having the furanose structure or the pyranose structure, and by making it contain suitably.

In the present invention, even if 20≤Ro≤100 (nm) and 70≤Rt≤200 (nm), the wavelength dispersion characteristic of 0.82≤Ro(480)/Ro(630)≤0.95 can be attained.

The desirable range in the present invention is 20≤Ro≤100 (nm), and is especially preferably 45≤Ro≤75 (nm).

The desirable range in the present invention is 70≤Rt≤200 (nm), and is especially preferably 105≤Rt≤140 (nm).

To achieve retardation values Ro and Rt which are described above, it is preferable that optical compensation film employs a constitution of this invention and refractive index control is further performed by a stretching operation.

For example, it is possible to perform successive or simultaneous stretching in the longitudinal direction of film (the cast direction) and in the direction perpendicular thereto, that is, in the width direction.

The stretching magnifications in the biaxial directions perpendicular to each other are preferably set to finally 0.8 to 1.5 times in the cast direction and 1.1 to 2.5 times in the width direction, and more preferably set to 0.8 to 1.0 times in the cast direction and 1.2 to 2.0 times in the width direction.

The stretching temperature is preferably 120° C. to 200° C., more preferably 160° C. to 200° C., still more preferably higher than 170° C. and not higher than 200° C.

It may be preferable to stretch a film under the condition where the content of the residual solvent in the film is 20 to 0, more preferably 15 to 0%. More concretely, the film is preferably stretched under the condition that the content of the residual solvent is 11% at 175° C., or the content of the residual solvent is 2% at 175° C., Otherwise, the content of the residual solvent is 11% at 185° C., or the content of the residual solvent is not higher than 1% at 185° C.

A method to stretch a web is not specifically limited. For example, listed a method to stretch in the longitudinal direction by making a circumferential speed difference among plural rolls and utilizing the roll circumferential speed difference among them, a method to stretch in the longitudinal direction by fixing the both edge of a web with clips or pins and widening the intervals between clips and pins toward the proceeding direction, a method to stretch by widening similarly along the width direction, or a method to stretch in the both of longitudinal and width directions by simultaneously widening along the longitudinal and width directions.

Of cause, these methods can be utilized in combination. In a so-called tenter method, it is preferable that a smooth stretching can be performed by driving the clip portion by a linear drive method which reduces risk to such as break.

It is preferable to perform the width holding or stretching in the width direction by a tenter, which may be either a pin tenter or a clip tenter.

The slow axis or the fast axis of optical compensation film of this invention preferably is present in a film plane and $\theta 1$ is preferably not less than $-1°$ and not more than $+1°$, and more preferably not less than 0.50 and not more than $+0.5°$, when the angle against the casting direction is $\theta 1$.

This $\theta 1$ can be defined as an orientation angle, and measurement of $\theta 1$ can be performed by use of automatic double refractometer KOBRA-21ADH (Oji Scientific Instruments). To satisfy the above-described relationships by $\theta 1$ can contributes to obtain a high luminance and to restrain or prevent light leak, and to obtain faithful color reproduction in a color liquid display (Physical Properties)

Moisture permeability of optical compensation film according to this invention is preferably 10 to 1,200 g/m$^2$·24 h, more preferably 20 to 1,000 g/m$^2$·24 h and specifically preferably 20 to 850 g/m$^2$·24 h at 40° C., 90% RH. Moisture permeability can be measured according to a method described in JIS Z 0208.

Elongation percentage of the optical compensation film according to this invention is preferably 10 to 80% and more preferably 20 to 50%.

Visible light transmittance of optical compensation film according to this invention is preferably not less than 90% and more preferably not less than 93%.

Haze of optical compensation film according to this invention is preferably less than 1% and specifically preferably 0 to 0.1%.

Further, if a liquid crystal layer is coated on the optical compensation film of the present invention, retardation values extending over a more wide range may be obtained.

(Polarizing Plate)

A polarizing plate and a liquid crystal display device according to the third embodiment and the fourth embodiment of this invention will be now explained.

A polarizing plate of this invention is characterized by being a polarizing plate constituted of a polarizer, pasted with the aforesaid optical compensation film of this invention as a polarizing protective film on at least one surface. A liquid crystal display device of this invention is characterized in that a polarizing plate according to this invention is pasted up on at least one liquid crystal cell surface via an adhesive layer.

A polarizing plate of this invention can be prepared by an ordinary method. The optical compensation film of this invention, the polarizer side of which is subjected to an alkaline saponification treatment, is preferably pasted up on at least one surface of a polarizer which has been prepared by immersion stretching in an iodine solution by use of a completely saponificated type polyvinyl alcohol aqueous solution.

On the other surface, said optical compensation film may be utilized or another polarizing plate protective film may be utilized. Cellulose ester film (such as Konica Minolta TAC KC8UX, RC4UX, KC5UX, KC8UCR3, KC8UCR4, KC8UCR5, KC8UY, KC4UY, KC12UR, KC4UE, KC8UE, KC8UY-14A, KC8UX-RHA, KC8UXW-RHA-C, KC8UXW-RHA-NC, and KC4UXW-RHA-NC manufactured by Konica Minolta Opto. Inc.) available on the market is also preferably utilized.

Onto the polarizing plate protective film used for the surface side of a display unit, it is desirable to provide an antireflection layer, an antistatic layer, an antifouling layer, and a back coat layer besides an antiglare layer or a clear hard coat layer.

A polarizer as a primary constitution element is an element to pass light of a polarized wave plane of a predetermined direction, and a typical polarizer known at present is polyvinyl type polarizing film, which includes polyvinyl alcohol film dyed with iodine and one dyed with dichroic dye.

As a polarizer, utilized is one in which a polyvinyl alcohol aqueous solution is cast, and the cast film is uniaxially stretched and dyed, or is uniaxially stretched after having been dyed, preferably followed by being subjected to a durability treatment with a boron compound. The layer thickness of a polarizer is preferably 5 to 30 μm and specifically preferably 10 to 20 μm.

Further, ethylene modified polyvinyl alcohol which is described in such as JP-A 2003-248123 and JP-A 2003-342322 and has an ethylene unit content of 1 to 4 mol %, a polymerization degree of 2,000 to 4,000 and a saponification degree of 99.0 to 99.99 mol % is also preferably utilized. Among them, ethylene modified polyvinyl alcohol having a hot water breaking temperature of 66 to 73° C. is preferably utilized. Further, a difference of hot water breaking temperature between two points remote from each other by 5 cm in the film TD direction is preferably not more than 1° C. and more preferably not more than 0.5° C., in order to reduce color spottiness.

A polarizer utilizing this ethylene modified polyvinyl alcohol film is excellent in polarizing ability and durability, as well as exhibits few color spottiness, and is specifically preferably applied in a large size liquid crystal display device.

A polarizer prepared in the above manner, generally on the both surface or one surface of which protective film is pasted up, is utilized as a polarizing plate. An adhesive employed at the time of paste up includes a PVA type adhesive and an urethane type adhesive, however, among them preferably utilized is a PVA type adhesive (Liquid Crystal Display)

By using the polarizing plate according to the third embodiment of the present invention for a liquid crystal display, various kinds of the liquid crystal displays of the present invention excellent in visibility can be produced. The optical compensation film of the present invention can be used for liquid crystal displays with various drive systems, such as STN, TN, OCB, HAN, VA (MVA, PVA), IPS, and OCB. It is desirable to use for a VA (MVA, PVA) type liquid crystal display. Especially, even if a liquid crystal display has a large screen more than 30 type, it is possible to obtain a liquid crystal display in which there are few environmental variations, light leakage is reduced, and visibility, such as color tone unevenness and front contrast is excellent. Especially, the frequency of occurrence of light leakage can be reduced by the group of the liquid crystal display manufactured by the use of the optical compensation film of the present invention.

EXAMPLE

Hereafter, although the present invention will be explained with reference to examples, the present invention is not limited to these examples.

Example 1

Example According to the First Embodiment

Production of Cellulose Ester Film 101

<Particulate Dispersion Liquid 1>

| Particulate (Aerosil 972 V Manufactured by Japan Aerosil) | 11 parts by weight |
| --- | --- |
| Ethanol | 89 parts by weight |

The substances listed above were agitated and mixed by a dissolver for 50 minutes and then dispersed by the use of Manton Gaulin.

<Particle Addition Liquid 1>

The particulate dispersion liquid 1 was slowly added into a solution tank storing methylene chloride, while being agitated sufficiently. Furthermore, the solution was dispersed by an at-righter so that the particle size of secondary particles became a predetermined size. The resultant solution was filtered by the use of Fine Met NF manufactured by Nippon Seisen Co., Ltd., whereby particle addition liquid 1 was prepared.

| Methylene chloride | 99 parts by weight |
| --- | --- |
| Particulate dispersion liquid 1 | 5 parts by weight |

A main dope liquid of the following composition was prepared. First, methylene chloride and ethanol were added to a pressure solution tank. Cellulose ester A and B were supplied into the pressure solution tank storing a solvent while being agitated. Further, it was dissolved completely while being heated and agitated. The resultant liquid was filtered by the use of Azumi filter paper No. 244 manufactured by Azumi Filter Paper Co., Ltd., whereby the main dope liquid was prepared.

<Composition of the Main Dope Liquid>

| Methylene chloride | 340 parts by weight |
| --- | --- |
| Ethanol | 64 parts by weight |
| Cellulose ester A of the present invention | 50 parts by weight |
| Cellulose ester B of the present invention | 50 parts by weight |
| Acrylic polymer A of the present invention | 3.0 parts by weight |
| Sugar ester compound 3 of the present invention | 10 parts by weight |
| Particle addition liquid 1 | 1 parts by weight |

The above substances were put into a sealed container and dissolved while being by agitated, whereby a dope liquid was prepared. Subsequently, by the use of an endless belt type casting apparatus, the dope liquid was uniformly cast on a stainless steel belt support at the temperature of 33° C. with a 1500 mm width. The temperature of the stainless belt was controlled at 50° C.

The solvent was evaporated on the stainless belt support until the remaining solvent amount in the cast film became 75-6, and then the cast film was peeled from the stainless steel belt support with a peeling force of 70 N/m.

The peeled cellulose ester film was stretched 45% in the width direction by the use of a tenter under the application of heat of 170° C. The residual solvent at the time of starting the stretching was 20%.

Subsequently, the drying of the cellulose ester film was completed while the cellulose ester was being conveyed through a drying zone convey with many rolls. A drying temperature was 120° C. and conveying tension was made 90 N/m.

As mentioned above, cellulose ester film 101 with a dried film thickness of 50 μm was obtained.

Hereafter, cellulose ester films 102 to 115 were produced almost in the similar manner except that the plasticizer further was added into cellulose ester films 109 and 111 and the kind of solvents and the film thickness, and the stretching magnification were changed as shown in Table 3.

Plasticizer A: Triphenyl phosphate
Plasticizer B: Ethylphthalyl ethyl glycolate
Plasticizer C: Biphenyl phosphate
Plasticizer D: Trimethylolpropanebenzonate ester Moreover, films 201 to 207 were produced as a comparative sample.

As comparative sample 204, the cellulose acylate film 1 described in Example 1 of Japanese Patent Unexamined Publication No. 2006-154803 was produced as follows.

<Preparation of Cellulose Acetate Solution A>

The following compositions were fed into a mixing tank and agitated so that each component was dissolved, whereby the cellulose acetate solution A was prepared.

| Cellulose acetate having the acetylation degree of 2.79 | 100.0 parts by weight |
| --- | --- |
| Triphenyl phosphate (plasticizer) | 8.0 parts by weight |
| Biphenyl phosphate (plasticizer) | 4.0 parts by weight |
| Methylene chloride (first solvent) | 402.0 parts by weight |
| Methanol (second solvent) | 6.0 parts by weight |

<Preparation of a Mat Agent Solution>

The following compositions were fed into a dispersion device and agitated so that each component was dissolved, whereby the mat agent solution was prepared.

| Silica particle having an average particle size of 20 nm (Aerosil R972 manufactured by Japan Aerosil) | 2.0 parts by weight |
| --- | --- |

-continued

| | |
|---|---|
| Methylene chloride (first solvent) | 75.5 parts by weight |
| Methanol (second solvent) | 12.7 parts by weight |
| Cellulose acetate solution A | 10.3 parts by weight |

<Preparation of a Retardation Exhibiting Agent Solution>

The following compositions were fed into a mixing tank and agitated while being heated so that each component was dissolved, whereby the retardation exhibiting agent solution was prepared.

| | |
|---|---|
| Retardation exhibiting agent (A) | 20.0 parts by weight |
| Methylene chloride (first solvent) | 58.4 parts by weight |
| Methanol (second solvent) | 8.7 parts by weight |
| Cellulose acetate solution A | 12.8 parts by weight |

By the use of an in-line mixer, 1.3 parts by weight of the above-mentioned mat agent solution and 2.9 parts by weight of the retardation exhibiting agent solution were mixed after being filtered respectively, further, 96.1 parts by weight of the cellulose acetate solution A was added and mixed in the in-line mixer, and then the resultant mixed solution was cast by the use of a band casting device.

The film was peeled from the band on the condition where the remains solvent content was 33%, and under the atmosphere temperature of 140° C., the film was stretched by the use of a tenter to stretch 120% in the transverse direction, then the film was held for 30 seconds at 140° C. The remains solvent content at the time of starting the stretching was 10% by weight.

Thereafter, clips were removed from the film, and the film was dried for 40 minutes at 130° C., whereby the cellulose acylate film 1 (comparative sample 204) was produced. The residual solvent content of the produced cellulose acylate film was 0.1% and thickness was 82 μm.

As comparative sample 205, the cellulose acylate film 101 described in Example 1 of Japanese Patent Unexamined Publication No. 2006-299171 was produced as follows.

<Preparation of Cellulose Acetate Solution>

The following compositions were fed into a mixing tank and agitated so that each component was dissolved, whereby the cellulose acetate solution 01 was prepared.

| | |
|---|---|
| Cellulose acetate having the acetylation degree of 2.86 | 100.0 parts by weight |
| Triphenyl phosphate (plasticizer) | 8.0 parts by weight |
| Biphenyl phosphate (plasticizer) | 4.0 parts by weight |
| Methylene chloride (first solvent) | 402.0 parts by weight |
| Methanol (second solvent) | 6.0 parts by weight |

<Preparation of a Mat Agent Solution 11>

The following compositions were fed into a dispersion device and agitated so that each component was dissolved, whereby the mat agent solution was prepared.

| | |
|---|---|
| Silica particle having an average particle size of 20 nm (Aerosil R972 manufactured by Japan Aerosil) | 2.0 parts by weight |
| Methylene chloride (first solvent) | 75.5 parts by weight |
| Methanol (second solvent) | 12.7 parts by weight |
| Cellulose acetate solution 01 | 10.3 parts by weight |

<Preparation of a Retardation Exhibiting Agent 21 Solution>

The following compositions were fed into a mixing tank and agitated while being heated so that each component was dissolved, whereby the retardation exhibiting agent solution was prepared.

| | |
|---|---|
| Retardation exhibiting agent (B) | 10.9 parts by weight |
| Retardation exhibiting agent (C) | 9.0 parts by weight |
| Methylene chloride (first solvent) | 58.4 parts by weight |
| Methanol (second solvent) | 8.7 parts by weight |
| Cellulose acetate solution 01 | 12.8 parts by weight |

<Preparation of Ultraviolet Absorber Solution 31>

The following compositions were fed into a mixing tank and agitated while being heated so that each component was dissolved, whereby the retardation exhibiting agent solution was prepared.

| | |
|---|---|
| Ultraviolet absorber (UV-A) | 10.0 parts by weight |
| Methylene chloride (first solvent) | 58.4 parts by weight |
| Methanol (second solvent) | 8.7 parts by weight |
| Cellulose acetate solution 01 | 12.8 parts by weight |

By the use of an in-line mixer, 1.3 parts by weight of the above-mentioned mat agent solution and 1.4 parts by weight of the ultraviolet absorber solution were mixed after being filtered respectively, further 6.2 parts by weight of the retardation exhibiting agent solution was mixed in the in-line mixer after being filtered, and further 91.1 parts by weight of the cellulose acetate solution 01 was added and mixed in the in-line mixer, and then the resultant mixed solution was cast by the use of a band casting device.

The film was peeled from the band on the condition where the remains solvent content was 38%, and under the atmosphere temperature of 140° C., the film was stretched by the use of a tenter to stretch with a stretching magnification of 20% in the transverse direction, then the film was held for 30 seconds at 130° C. The remains solvent content at the time of starting the stretching was 10% by weight.

Thereafter, clips were removed from the film, and the film was dried for 40 minutes at 130° C., whereby the cellulose acylate film 101 (comparative sample 205) was produced. The residual solvent content of the produced cellulose acylate film was 0.1% and thickness was 81 μm.

TABLE 1

| Cellulose ester | Acyl group substitution degree | | Total acyl group substitution degree |
|---|---|---|---|
| A | Acetyl group: 1.6 | Propionyl group: 0.9 | 2.5 |
| B | Acetyl group: 1.5 | Propionyl group: 0.9 | 2.4 |
| C | Acetyl group: 1.9 | Propionyl group: 0.8 | 2.7 |
| D | Acetyl group: 2.79 | Propionyl group: 0 | 2.79 |
| E | Acetyl group: 2.86 | Propionyl group: 0 | 2.86 |

TABLE 2

| Acrylic polymer | Main composition | Molecular weight |
|---|---|---|
| A | Polymethyl acrylate | 1000 |
| B | Polybutyl acrylate | 1500 |

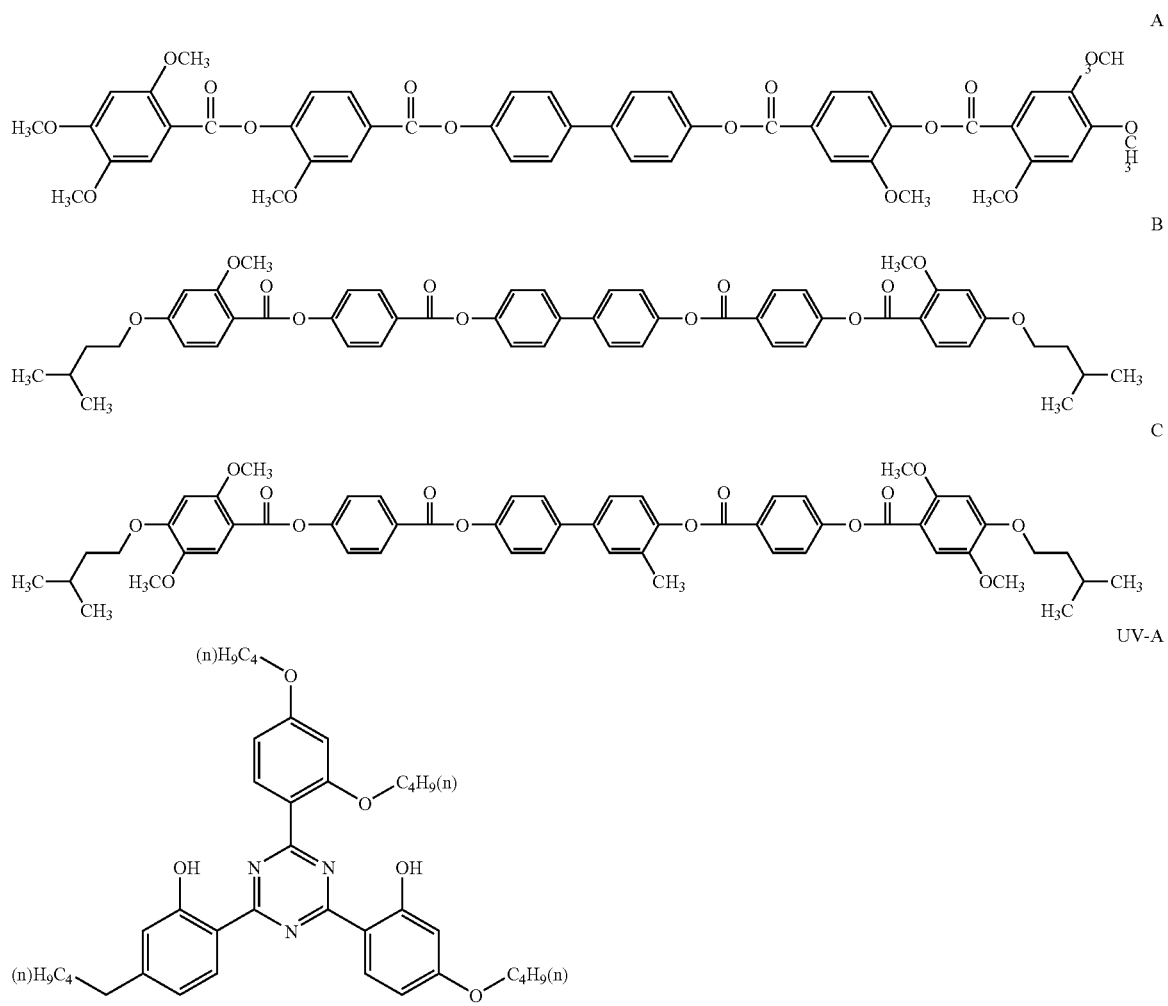

Retardation value in each wavelength, haze, and scattered light intensity were measured for each obtained sample in the following ways. Results are shown in Table 3.

TABLE 3

| Cellulose ester No. | Acrylic polymer Resin Kinds | Acrylic polymer Kinds | Acrylic polymer Parts by weight | Sugar ester compound Kinds | Sugar ester compound Parts by weight | Plasticizer (parts by weight) | *1 | Producing conditions *2 | Producing conditions *3 | Producing conditions *4 | Retardation Ro (nm) | Retardation Rt (nm) | Haze | Scattering light intensity Difference | Scattering light intensity Horizontal |
|---|---|---|---|---|---|---|---|---|---|---|---|---|---|---|---|
| 101 | A | A | 3.0 | 3 | 10.0 | — | — | 1.45 | 50 | 170 | 60 | 130 | 0.15 | 0.01 | 0.01 |
| 102 | A | A | 3.0 | 3 | 10.0 | — | — | 1.35 | 50 | 180 | 60 | 125 | 0.41 | 0.02 | 0.03 |
| 103 | B | A | 3.0 | 3 | 10.0 | — | — | 1.37 | 50 | 185 | 65 | 120 | 0.33 | 0.01 | 0.03 |
| 104 | C | A | 3.0 | 3 | 10.0 | — | — | 1.40 | 50 | 188 | 65 | 115 | 0.25 | 0.00 | 0.01 |
| 105 | A | A | 3.0 | 3 | 10.0 | — | — | 1.40 | 50 | 180 | 65 | 115 | 0.23 | 0.01 | 0.03 |
| 106 | A | A | 3.0 | 4 | 10.0 | — | — | 1.40 | 50 | 160 | 62 | 125 | 0.23 | 0.03 | 0.04 |
| 107 | A | A | 3.0 | 3 | 10.0 | — | — | 1.50 | 50 | 165 | 60 | 125 | 0.17 | 0.02 | 0.04 |
| 108 | A | A | 3.0 | 3 | 10.0 | — | — | 1.45 | 50 | 172 | 62 | 140 | 0.17 | 0.02 | 0.03 |
| 109 | A | A | 3.0 | 3 | 10.0 | A(5.0) | — | 1.40 | 50 | 160 | 60 | 120 | 0.20 | 0.02 | 0.03 |
| 110 | A | A | 3.0 | 12 | 10.0 | — | — | 1.42 | 50 | 165 | 60 | 124 | 0.35 | 0.04 | 0.05 |
| 111 | A | A | 3.0 | 3 | 10.0 | B(5.0) | — | 1.45 | 50 | 160 | 60 | 120 | 0.15 | 0.05 | 0.06 |
| 112 | A | A | 3.0 | 3 | 7.0 | — | — | 1.42 | 50 | 180 | 60 | 105 | 0.27 | 0.01 | 0.02 |
| 113 | A | A | 3.0 | 3 | 10.0 | — | — | 1.50 | 40 | 170 | 60 | 130 | 0.15 | 0.01 | 0.03 |

TABLE 3-continued

| | | Dope constituting materials | | | | | | Producing conditions | | | Optical characteristics | | | | |
| | | Acrylic polymer | | Sugar ester compound | | | | | | | | Retardation | | | Scattering light intensity |
| Cellulose ester No. | Resin Kinds | Kinds | Parts by weight | Kinds | Parts by weight | Plasticizer (parts by weight) | *1 | *2 | *3 | *4 | | Ro (nm) | Rt (nm) | Haze | Difference | Horizontal |
|---|---|---|---|---|---|---|---|---|---|---|---|---|---|---|---|---|
| 114 | A | A | 3.0 | 3 | 10.0 | — | — | 1.25 | 80 | 170 | | 60 | 130 | 0.15 | 0.02 | 0.18 |
| 115 | A | B | 3.0 | 5 | 10.0 | — | — | 1.45 | 50 | 155 | | 60 | 125 | 0.15 | 0.01 | 0.21 |
| 201 | A | — | — | 5 | 10.0 | — | — | 1.40 | 50 | 130 | | 59 | 119 | 0.70 | 0.12 | 0.25 |
| 202 | A | A | 3.0 | — | — | — | — | 1.35 | 50 | 130 | | 60 | 135 | 0.85 | 0.08 | 0.15 |
| 203 | A | — | — | 3 | 5.0 | A(5.0) | — | 1.45 | 50 | 130 | | 60 | 145 | 1.05 | 0.21 | 0.24 |
| 204 | D | — | — | — | — | A(8.0), C(4.0) | A | 1.20 | 82 | 140 | | 81 | 201 | 0.50 | 0.14 | 0.15 |
| 205 | E | — | — | — | — | A(8.0), C(4.0) | B, C | 1.20 | 81 | 140 | | 85 | 190 | 0.75 | 0.15 | 0.25 |
| 206 | C | — | — | — | — | B(5.0), D(5.0) | — | 1.20 | 80 | 140 | | 85 | 180 | 0.80 | 0.09 | 0.21 |
| 207 | C | — | — | — | — | A(8.5), B(2.0) | — | 1.30 | 80 | 135 | | 60 | 145 | 1.05 | 0.12 | 0.18 |

*1: Retardation increasing agent,
*2: Stretching ratio,
*3: Film thickness (μm)
*4: Stretching temperature (° C.)

<<Measurement of Retardation Ro and Rt>>

Samples were cut out with a size of 35 mm×35 mm from the obtained films, retardation values were measured in a vertical direction by the use of an automatic birefringence analyzer (KOBRA-21ADH manufactured by Oji Scientific Instruments) under an ambience of 25° C., 55% RH with a wavelength of 480 nm, 590 nm, and 630 nm for each samples, and also retardation values were measured with the same ways on the condition that the film surface of each samples was slanted, then retardation values were calculated from extrapolation values of these measured retardation values.

<<Haze>>

According to JIS K-6714, the haze was measured by the use of a haze meter 1001DP type manufactured by Nippon Denshoku.

<<Scattered Light Intensity>>

The scattered light intensity was measured by the use of a goniophotometer, type: GP-1-3D, manufactured by optic corporation (a light source was a 12V50 W halogen ball, and a light receiving section was a photomultiplier tubes (Photomul, Hamamatsu photonics R636-10)).

Here, an amount of light at the time of measurement was rectified with the amount of light at θ=1800 (Photomul light receiving sensitivity: −185V), and the measured value with this amount of light was made as the scattered light intensity.

The sample was measured on the condition where the slow axis of the film was fixed horizontally and vertically to the sample stand respectively.

It was learned that the optical compensation films 101-115 satisfy the scattered light intensity according to the first embodiment of the present invention and the haze is small. On the other hand, the optical compensation films 201-207 do not satisfy the scattered light intensity according to the first embodiment of the present invention. The evaluations employing these optical compensation films and the liquid crystal display devices are shown hereafter.

Example 2

Preparation of Polarizing Plate

A polyvinyl alcohol film having a thickness of 120 μm was uniaxially stretched (temperature 110° C., stretching ratio: 5 times).

The film was immersed in an aqueous solution of 0.075 g iodine, 5 g potassium iodide, and 100 g water for 60 seconds, and then immersed in a 68° C. aqueous solution of 6 g potassium iodide, 7.5 g boric acid and 100 g water. The film was washed and dried to obtain a polarizing film.

Next, the polarizing film and the cellulose ester films 101 to 207 of the present invention were pasted onto the front side and a Konica Minolta TAC KC4UY (cellulose ester film manufactured by Konica Minolta Opt. Corp. was pasted on the back side in accordance with the following steps 1 to 5, whereby polarizing plates were prepared.

Step 1: The cellulose ester films were immersed for 90 seconds in 2 mol/L of sodium hydroxide solution at 60° C. and then washed and dried, whereby the cellulose ester films whose side to be pasted to a polarizing element was saponified were obtained.

Step 2: The polarizing film was immersed in a tank of polyvinyl alcohol adhesive having a solid content of 2 mass % for 1 to 2 seconds.

Step 3: Excess adhesive attached to the polarizing film in Step 2 was gently wiped off and then the polarizing film was placed on the cellulose ester films processed in Step 1.

Step 4: The cellulose ester films 101 to 207 and the polarizing film which were stacked in Step 3, and the cellulose ester films on the back side were pasted together at a pressure of 20 to 30 N/cm² and a conveyance speed of approximately 2 m/minute.

Step 5: The samples in which the polarizing cellulose ester films 101 to 207, and Konica Minolta TAC KC4Uy were prepared in Step 4 were dried for 2 minutes in a dryer at 80° C., whereby the polarizing plates 101 to 115 of the present invention and the comparative polarizing plates 2D1 to 207 were prepared.

<Production of a Liquid Crystal Display>

A liquid crystal panel to perform view field angle measurement was produced as follows, and the characteristics as a liquid crystal display was evaluated.

The polarizing plates preliminarily pasted on both sides of a 40 type display KLV-40V1000 manufactured by SONY were removed, and the polarizing plates 101 to 115, 201 to 207 which produced as mentioned above were pasted onto both sides of a glass surface of a liquid crystal cell respectively.

At this time, the polarizing plates were pasted in such a direction that the plane of the cellulose ester film of the present invention became the liquid crystal cell side and the absorption axis was directed to the same direction as the preliminarily pasted polarizing plate, whereby the liquid crystal displays 101 to 115 of the present invention and the comparative liquid crystal displays 201 to 207 were produced respectively.

These liquid crystal displays were evaluated in terms of color tone fluctuation and front contrast. Results are shown in Table 5.

<<Evaluation of Color Tone Fluctuation>>

The color tone fluctuation was measured by use of a measuring device (EZ-Contrast 160D manufactured by ELDIM) for each of the liquid crystal displays produced as mentioned above as follows. In CIE1976 UCS coordinate, and the maximum color tone fluctuation range (delta u'v') in the upward and downward direction (upward 800 to downward 800 from the display normal line) was compared.

<<Evaluation of Front Contrast>>

In the environment of 23° C. 55% RH, after the backlight of each of the liquid crystal displays was continuously lighted for one week, the measurement was performed. EZ-Contrast 160D manufactured by ELDIM was used for the measurement in such a way that the luminance from the normal line direction of the display screen was measured on a white display mode and a black display mode of the liquid crystal display, and the ratio between the luminance values on the white display mode and the black display mode was made as the front contrast.

Front contrast=(luminance on the white display mode measured from the normal line direction of the display device)/(luminance on the black display mode measured from the normal line direction of the display device)

TABLE 4

| liquid crystal display device | Color tone fluctuation (Δu'v') | Front contrast | Remarks |
| --- | --- | --- | --- |
| 101 | 0.06 | 1170 | Invention |
| 102 | 0.08 | 1150 | Invention |
| 103 | 0.07 | 1120 | Invention |
| 104 | 0.08 | 1120 | Invention |
| 105 | 0.07 | 1130 | Invention |
| 106 | 0.05 | 1170 | Invention |
| 107 | 0.05 | 1140 | Invention |
| 108 | 0.06 | 1120 | Invention |
| 109 | 0.06 | 1110 | Invention |
| 110 | 0.06 | 1150 | Invention |
| 111 | 0.06 | 1150 | Invention |
| 112 | 0.07 | 1150 | Invention |
| 113 | 0.08 | 1150 | Invention |
| 114 | 0.07 | 1170 | Invention |
| 115 | 0.06 | 1150 | Invention |
| 201 | 0.16 | 950 | Comparative example |
| 202 | 0.18 | 950 | Comparative example |
| 203 | 0.18 | 930 | Comparative example |
| 204 | 0.15 | 970 | Comparative example |
| 205 | 0.17 | 980 | Comparative example |
| 206 | 0.16 | 950 | Comparative example |
| 207 | 0.15 | 980 | Comparative example |

It is clear from the result of Table 4 that the polarizing plates 101 to 115 of the present invention are a polarizing plate excellent in color tone fluctuation and front contrast.

Example 3

Example According to the Second Embodiment

The cellulose ester, the (meth)acrylic polymer, the compound (sugar ester compound) having a furanose structure or pyranose structure, the plasticizer, and the ultraviolet absorber which were used in Example 3 are shown in Table 5.

TABLE 5

| Cellulose ester | Acyl group substitution degree | Total acyl group substitution degree |
| --- | --- | --- |
| A | Acetyl group: 1.9 Propionyl group: 0.8 | 2.7 |
| B | Acetyl group: 1.6 Propionyl group: 0.9 | 2.5 |
| C | Acetyl group: 1.1 Propionyl group: 0.9 | 2.0 |
| D | Acetyl group: 1.2 Propionyl group: 1.1 | 2.3 |
| E | Acetyl group: 2.4 | 2.4 |
| F | Acetyl group: 1.3 Propionyl group: 1.2 | 2.5 |

| (Meth)acrylic polymer | Main composition | Molecular weight | Ratio |
| --- | --- | --- | --- |
| A | Polymethyl acrylate | 1000 | 100 |
| B | methyl methacrylate/ hydroxyethyl methacrylate | 4000 | 90/10 |

| Sugar ester compound | |
| --- | --- |
| A | Compound 3 |
| B | Compound 5 |
| C | Mixing compounds 6 and 7 with ratio of 1:1 by weight |
| D | Compound 8 |

| Plasticizer | |
| --- | --- |
| A | Triphenyl phosphate |
| B | Ethylphthalyl ethylglycolate |
| C | Trimethylolpropan tribenzoate |

| Ultraviolet absorbent | |
| --- | --- |
| A | Tinuvin 326 (Ciba Specialty Chemicals) |
| B | Tinuvin 109 (Ciba Specialty Chemicals) |
| C | Tinuvin 171 (Ciba Specialty Chemicals) |

Above-mentioned (meth)acrylic polymers A and B used in the example are compounds shown below.

(Meth)acrylic polymer A: Block polymerization was conducted in accordance with the polymerization method described in Japanese Patent Unexamined Publication. No. 2000-128911. Namely, the below-mentioned methyl acrylate was supplied as a monomer into a flask equipped with an agitator, a nitrogen gas introducing pipe, a thermometer, a supply port, and a circulating cooling tube. Nitrogen gas was introduced such that the inside of the flask was replaced with the nitrogen gas, and then the below-mentioned thioglycerol was added while agitating.

After the thioglycerol was added, polymerization was conducted for 4 hours. Then, the temperature of the content was returned to a room temperature, and 20 parts by weight of benzoquinone 5 weight % tetrahydrofuran solutions was added to the content, whereby the polymerization was stopped. The content was shifted to an evaporator, and tetrahydrofuran, a residual monomer, and the residual thioglycerol were removed under a reduced pressure at 80° C., whereby (meth)acrylic polymer A was obtained.

Meth)acrylic-polymer B: 40 g of a monomer mixed solution of kinds and ratios shown in Table 2, 3.0 g of mercaptopropionic acid a chain transfer agent and 30 g of toluene of and were supplied into a glass flask equipped with an agitator, two dropping funnels, a gas introducing pipe, and a thermometer, and the temperature was raised to 90° C. Then, 60 g of a monomer mixed solution of kinds and ratios shown in Table 1 was dropped over 3 hours from one dropping funnel, and simultaneously 0.6 g of azobisisobutyronitrile dissolved in 14 g of toluene was dropped over 3 hours from another funnel. Thereafter, after 0.6 g of azobisisobutyronitrile dissolved in 56 g of toluene was further dropped over 2 hours, the reaction was made to continue for 2 hours, whereby (meth)acrylic polymer B was obtained.

TABLE 6

| -(Ya)k-(Yb)q- | | | | |
|---|---|---|---|---|
| Ya | k | Yb | q | Mw |
| (Meth)acrylic polymer A    MA | 100 | — | 0 | 1000 |

| -(Xa)m-(Xb)n-(Xc)p- | | | | | | |
|---|---|---|---|---|---|---|
| Name of compound | Xa | m | Xb | n | Xc | p | Mw |
| (Meth)acrylic polymer B | MMA | 90 | HEMA | 10 | — | 0 | 4000 |

MA, MMA, and HEMA described in Table 6 are the abbreviated names of the following compounds, respectively.

MA: Methyl acrylate
MMA: Methyl methacrylate
HEMA: 2-hydroxyethyl methacrylate

The weight average molecular weight of the (meth)acrylic polymers A and B shown in Table 2 were measured with the following measuring method.

(Measurement of Molecular Weight)

Weight average molecular weight was measured by use of high speed liquid chromatography.

The measurement conditions are as follows.
Solvent: Methylene chloride
Column: Shodex K806, K805 and K803G (3 columns, manufactured by Showa Denko Co., Ltd., were utilized in connection)
Column temperature: 25° C.
Sample concentration: 0.1 weight %
Detector: RI Model 504 (manufactured by GL Science Corp.)
Pump: L6000 (manufactured by Hitachi Corp.)
Flow rate: 1.0 ml/mm
Calibration curve: Utilized is a calibration curve based on 13 samples of standard polystyrene STK (manufactured by Toso Co., Ltd.) having Mw=1,000,00–500. 13 samples are utilized at approximately same intervals.
<Production of Optical Compensation Film 101>
<Particulate Dispersion Liquid 1>

| Particulate (Aerosil 972 V manufactured by Japan Aerosil) | 11 parts by weight |
| Ethanol | 89 parts by weight |

The substances listed above were agitated and mixed by a dissolver for 50 minutes and then dispersed by the use of Manton Gaulin.
<In-Line Additive Liquid>

Cellulose ester B was added into a solution tank storing methylene chloride, heated and dissolved completely. Thereafter the resultant solution was filtered by the use of Azumi filter paper No. 244 manufactured by Azumi Filter Paper Co., Ltd.

While the filtered cellulose ester solution was fully being agitated, particulate dispersion liquid was added slowly into the solution. Furthermore, the solution was dispersed by an at-righter so that the particle size of secondary particles became a predetermined size. The resultant solution was filtered by the use of Fine Met NF manufactured by Nippon Seisen Co., Ltd., whereby inline additive liquid 1 was prepared.

| Methylene chloride | 99 parts by weight |
| Cellulose ester B | 4 parts by weight |
| Particulate dispersion liquid 1 | 11 parts by weight |

A main dope liquid of the following composition was prepared. First, methylene chloride and ethanol were added to a pressure solution tank. Cellulose ester B was supplied into the pressure solution tank storing a solvent while being agitated. Further, it was dissolved completely while being heated and agitated. The resultant liquid was filtered by the use of Azumi filter paper No. 244 manufactured by Azumi Filter Paper Co., Ltd., whereby the main dope liquid was prepared.

| Methylene chloride | 380 parts by weight |
| Ethanol | 70 parts by weight |
| Cellulose ester B | 100 parts by weight |
| (Meth)acrylic polymer A of the present invention | 5.5 parts by weight |
| Sugar ester compound of the present invention | 5.5 parts by weight |

The above substances were put into a sealed container and completed dissolved by being heated and stirred, and then filtered by the use of Azumi filter paper No. 24 manufactured by Azumi Filter Paper Co., Ltd., whereby a dope solution was prepare.

The dope solution was filtered with Fine Met NF manufactured by Nippon Seisen Co., Ltd in a film manufacturing line. The inline additive liquid was filtered in a inline additive liquid line by Fine Met NF manufactured by Nippon Seisen Co., Ltd. Into 100 parts by weight of the filtered dope solution, 2 parts by weight of the filtered inline additive liquid was added, and then sufficiently mixed by an inline mixer (Toray static in-line mixer Hi-Mixer SWJ). Then, by the use of a belt casting device, the resultant mixture solution was evenly cast with a width of 1.8 m at 35° C. on a stainless steel band support. The solvent was evaporated on the stainless steel band support until the remaining solvent amount became 120%, and then the cast film was peeled from the stainless steel band support. The solvent in a web of the peeled cellulose ester film was evaporated at 50° C., and the web was slit into a width of 1.65 m, and subsequently stretched by a tenter in the TD direction (direction perpendicular to the web conveyance direction) with a stretching magnification rate at a temperature shown in Table 3. The web was being conveyed with a large number of rollers in a drying zone of 120° C., and then a drying process was completed. Thereafter, the web was slit into a width of 1.5 m and subjected to a knurling process such that a knurling was made on both sides of the web with a width of 15 mm and an average height of 10 μm, whereby a optical compensation film 101 having a average layer thickness of 40 μm was prepared. Here, a film width was 1.5 m and a winding up length was 5000 m.

Furthermore, optical compensation films 102-134 were prepared with the similar manner except that a plasticizer and a ultraviolet absorber were added and the stretching magnification in the TD direction and the thickness were changed as shown in Table 7 and Table 8, also, comparative optical compensation films 201-203 were prepared with the similar manner except that a (meth)acrylic polymer and a sugar ester compound were not added respectively.

Retardation value was measured for each obtained sample in the following ways for each wavelength, and the results of measurement are shown in Table 7 and Table B.

(Measurement of Retardation Ro and Rt)

Samples were cut out with a size of 35 mm×35 mm from the obtained films, retardation values were measured in a vertical direction by the use of an automatic birefringence analyzer (KOBRA-21ADH manufactured by Oji Scientific Instruments) under an ambience of 25° C., 55% R11 with a wavelength of 480 nm, 590 nm, and 630 nm for each samples, and also retardation values were measured with the same ways on the condition that the film surface of each samples was slanted, then retardation values were calculated from extrapolation values of these measured retardation values.

TABLE 7

| | Dope constituting materials | | | | | | | | | | Producing conditions | | | Optical characteristics | | | | *4 |
| | Cellulose ester | | (Meth) acrylic polymer | | Sugar ester compound | | Plasticizer (*1) | Ultraviolet absorber (*1) | *2 | Film thickness (μm) | *3 | Retardation | | | | Ro (480)/ Ro (630) |
| ** | Kinds | *1 | Kinds | *1 | Kinds | *1 | Kinds | *1 | | | | | | Ro (nm) | Rt (nm) | Ro (480) (nm) | Ro (630) (nm) | |
|---|---|---|---|---|---|---|---|---|---|---|---|---|---|---|---|---|---|---|
| 301 | B | 100 | — | — | A | 5.5 | A | 5.5 | — | — | 1.4 | 40 | 180 | 60 | 130 | 57 | 61 | 0.94 |
| 302 | B | 100 | — | — | A | 5.5 | B | 5.5 | — | — | 1.4 | 40 | 180 | 55 | 140 | 53 | 56 | 0.95 |
| 303 | B | 100 | — | — | A | 5.5 | C | 5.5 | — | — | 1.4 | 40 | 171 | 58 | 120 | 55 | 59 | 0.93 |
| 304 | B | 100 | — | — | A | 5.5 | D | 5.5 | — | — | 1.3 | 40 | 171 | 45 | 125 | 40 | 46 | 0.88 |
| 305 | B | 100 | — | — | B | 5.5 | A | 5.5 | — | — | 1.3 | 40 | 171 | 52 | 130 | 48 | 53 | 0.91 |
| 306 | B | 100 | — | — | B | 5.5 | B | 5.5 | — | — | 1.6 | 60 | 171 | 62 | 125 | 94 | 101 | 0.93 |
| 307 | B | 100 | — | — | B | 5.5 | C | 5.5 | — | — | 1.5 | 60 | 160 | 88 | 160 | 80 | 89 | 0.90 |
| 308 | B | 100 | — | — | B | 5.5 | D | 5.5 | — | — | 1.5 | 50 | 180 | 70 | 140 | 60 | 71 | 0.84 |
| 309 | B | 100 | — | — | B | 5.5 | B | 0.2 | B(5.3) | — | 1.2 | 40 | 180 | 60 | 120 | 59 | 62 | 0.95 |
| 310 | B | 90 | A | 10 | A | 5.5 | A | 5.5 | — | — | 1.4 | 40 | 180 | 54 | 124 | 52 | 55 | 0.94 |
| 311 | B | 80 | A | 20 | A | 5.5 | A | 5.5 | — | — | 1.4 | 40 | 180 | 50 | 120 | 48 | 51 | 0.94 |
| 312 | B | 70 | A | 30 | A | 5.5 | A | 5.5 | — | — | 1.4 | 40 | 180 | 45 | 115 | 42 | 46 | 0.92 |
| 313 | B | 60 | A | 40 | A | 5.5 | A | 5.5 | — | — | 1.4 | 40 | 180 | 40 | 110 | 37 | 41 | 0.90 |
| 314 | F | 100 | — | — | A | 5.5 | A | 5.5 | — | A(0.4)/ B(0.7)/ C(0.6) | 1.4 | 40 | 180 | 54 | 124 | 52 | 55 | 0.95 |
| 315 | A | 100 | — | — | A | 3.5 | A | 11.5 | — | — | 1.3 | 40 | 200 | 20 | 70 | 17 | 21 | 0.82 |
| 316 | A | 100 | — | — | A | 3.5 | B | 11.5 | — | — | 1.3 | 40 | 190 | 35 | 90 | 31 | 36 | 0.85 |
| 317 | A | 100 | — | — | A | 3.5 | C | 11.5 | — | — | 1.4 | 40 | 190 | 44 | 99 | 40 | 45 | 0.89 |
| 318 | E | 100 | — | — | A | 5.2 | C | 5.5 | — | A(0.4)/ B(0.7)/ C(0.6) | 1.3 | 40 | 190 | 59 | 119 | 55 | 63 | 0.87 |
| 319 | A | 100 | — | — | A | 3.5 | D | 11.5 | — | — | 1.4 | 40 | 190 | 39 | 78 | 35 | 40 | 0.88 |
| 320 | A | 100 | — | — | B | 3.5 | A | 11.5 | — | — | 1.4 | 40 | 190 | 45 | 97 | 39 | 45 | 0.87 |

**: Optical compensation film No.,
*1: Parts by weight,
*2: Stretching ratio
*3: Stretching temperature (° C.),
*4: Wavelength dispersion characteristic

TABLE 8

| | Dope constituting materials | | | | | | | | | | Producing conditions | | | Optical characteristics | | | | *4 |
| | Cellulose ester | | (Meth) acrylic polymer | | Sugar ester compound | | Plasticizer (*1) | Ultraviolet absorber (*1) | *2 | Film thickness (μm) | *3 | Retardation | | | | Ro (480)/ Ro (630) |
| ** | Kinds | *1 | Kinds | *1 | Kinds | *1 | Kinds | *1 | | | | | | Ro (nm) | Rt (nm) | Ro (480) (nm) | Ro (630) (nm) | |
|---|---|---|---|---|---|---|---|---|---|---|---|---|---|---|---|---|---|---|
| 321 | A | 100 | — | — | B | 3.5 | B | 11.5 | — | — | 1.4 | 40 | 200 | 37 | 94 | 35 | 38 | 0.91 |
| 322 | A | 100 | — | — | B | 3.5 | C | 11.5 | — | — | 1.2 | 40 | 200 | 22 | 60 | 20 | 23 | 0.87 |
| 323 | A | 100 | — | — | B | 3.5 | D | 11.5 | — | — | 1.3 | 40 | 200 | 38 | 55 | 34 | 39 | 0.88 |
| 324 | A | 100 | — | — | B | 3.5 | D | 0.4 | A(5.5) | — | 1.4 | 40 | 180 | 58 | 120 | 51 | 59 | 0.86 |
| 325 | C | 100 | — | — | A | 11.5 | A | 3.5 | — | — | 1.1 | 40 | 175 | 20 | 200 | 18 | 21 | 0.87 |
| 326 | C | 100 | — | — | A | 11.5 | B | 3.5 | — | — | 1.4 | 40 | 175 | 70 | 150 | 67 | 71 | 0.94 |

TABLE 8-continued

| | Dope constituting materials | | | | | | | | | | Producing conditions | | | Optical characteristics | | | | *4 |
|---|---|---|---|---|---|---|---|---|---|---|---|---|---|---|---|---|---|---|
| | Cellulose ester | | (Meth) acrylic polymer | | Sugar ester compound | | Plasti- | Ultra- violet | | | Film thickness | | Retardation | | | | Ro (480)/ Ro |
| ** | Kinds | *1 | Kinds | *1 | Kinds | *1 | cizer (*1) | absorber (*1) | *2 | (μm) | *3 | Ro (nm) | Rt (nm) | Ro (480) (nm) | Ro (630) (nm) | (630) |
| 327 | C | 100 | — | — | A | 11.5 | C | 3.5 | — | — | 1.5 | 50 | 175 | 65 | 160 | 61 | 66 | 0.92 |
| 328 | D | 100 | — | — | A | 4.9 | B | 0.9 | A(5.5) | — | 1.3 | 40 | 175 | 61 | 122 | 56 | 63 | 0.89 |
| 329 | C | 100 | — | — | A | 11.5 | D | 3.5 | — | — | 1.3 | 60 | 200 | 100 | 70 | 93 | 101 | 0.92 |
| 330 | C | 100 | — | — | B | 11.5 | A | 3.5 | — | — | 1.3 | 40 | 175 | 45 | 110 | 44 | 47 | 0.93 |
| 331 | C | 100 | — | — | B | 11.5 | B | 3.5 | — | — | 1.2 | 40 | 175 | 37 | 103 | 36 | 38 | 0.94 |
| 332 | C | 100 | — | — | B | 11.5 | C | 3.5 | — | — | 1.4 | 60 | 175 | 96 | 180 | 93 | 98 | 0.95 |
| 333 | C | 100 | — | — | B | 11.5 | D | 3.5 | — | — | 1.4 | 60 | 175 | 84 | 130 | 81 | 85 | 0.95 |
| 334 | C | 100 | — | — | B | 11.5 | D | 0.5 | C(5.1) | — | 1.5 | 60 | 160 | 88 | 160 | 80 | 89 | 0.90 |
| 401 | A | 100 | — | — | — | — | — | — | A(5.5) | — | 1.4 | 40 | 175 | 30 | 100 | 27 | 36 | 0.75 |
| 402 | A | 100 | — | — | — | — | A | 11.0 | — | — | 1.4 | 40 | 175 | 45 | 110 | 44 | 46 | 0.96 |
| 403 | A | 100 | — | — | A | 25.0 | — | — | — | — | 1.4 | 50 | 175 | 63 | 130 | 52 | 65 | 0.80 |

\*\*: Optical compensation film No.,
\*1: Parts by weight,
\*2: Stretching ratio
\*3: Stretching temperature (° C.),
\*4: Wavelength dispersion characteristic It turns out that the optical compensation films 101-134 of the present invention are excellent in wavelength dispersion characteristic in comparison with the comparative films.

<Preparation of Polarizing Plate>

A polyvinyl alcohol film having a thickness of 120 μm was uniaxially stretched (temperature 110° C., stretching ratio: 5 times). The film was immersed in an aqueous solution of 0.075 g iodine, 5 g potassium iodide, and 100 g water for 60 seconds, and then immersed in a 68° C. aqueous solution of 6 g potassium iodide, 7.5 g boric acid and 100 g water. The film was washed and dried to obtain a polarizing film.

Next, the polarizing film and the optical compensation films 101 to 134 of the present invention and the comparative optical compensation films 201-203 were pasted onto the front side and a Konica Minolta TAC KC4UY (cellulose ester film manufactured by Konica Minolta Opt. Corp was pasted on the back side in accordance with the following steps 1 to 5, whereby polarizing plates were prepared.

Step 1: The optical compensation films were immersed for 90 seconds in 2 mol/L of sodium hydroxide solution at 60° C. and then washed and dried, whereby the optical compensation films whose side to be pasted to a polarizing element was saponified were obtained.

Step 2: The polarizing film was immersed in a tank of polyvinyl alcohol adhesive having a solid content of 2 mass % for 1 to 2 seconds.

Step 3: Excess adhesive attached to the polarizing film in Step 2 was gently wiped off and then the polarizing film was placed on the optical compensation films processed in Step 1.

Step 4: The optical compensation films 101 to 134 and 201 to 203 and the polarizing film which were stacked in Step 3, and the cellulose ester films on the back side were pasted together at a pressure of 20 to 30 N/cm$^2$ and a conveyance speed of approximately 2 m/minute.

Step 5: The samples in which the polarizing film, the optical compensation films 101 to 134 and 201 to 203, and Konica Minolta TAC KC4Uy were prepared in Step 4 were dried for 2 minutes in a dryer at 80° C., whereby the polarizing plates 101 to 134 of the present invention and the comparative polarizing plates 201 to 203 were prepared.

An amount of light leakage was measured for each of the obtained polarizing plate. Results are shown in Table 9.

<<Evaluation of an Amount of Light Leakage>>

Two sheets of the produced polarizing plates were arranged in the state of cross nicol, and the transmittance (T1) at 590 nm was measured by the use of the spectrophotometer U3100 manufactured by Hitachi, Ltd.

Furthermore, after the two sheets of the polarizing plates were processed on the condition of 80° C. 90% RH for 100 hours, the transmittance (T2) when the two sheets of the produced polarizing plates were arranged in the state of cross nicol as same as the above was measured, a change of the transmittance before and after the thermal treatment was investigated, and an amount of light leakage was measured in accordance with the following formula.

Amount (%) of light leakage=$T2(\%)-T1(\%)$

The amount of light leakage is desirably 0 to 1.5%, and more desirably 1% or less.

<Production of a Liquid Crystal Display>

A liquid crystal panel to perform view field angle measurement was produced as follows, and the characteristics as a liquid crystal display was evaluated.

The polarizing plates preliminarily pasted on both sides of a 40 type display KLV-40V1000 manufactured by SONY were removed, and the polarizing plates 101 to 134, 201 to 203 which produced as mentioned above were pasted onto both sides of a glass surface of a liquid crystal cell respectively. At this time, the polarizing plates were pasted in such a direction that the plane of the optical compensation film of the present invention became the liquid crystal cell side and the absorption axis was directed to the same direction as the preliminarily pasted polarizing plate, whereby the liquid crystal displays 101 to 134 of the present invention and the comparative liquid crystal displays 201 to 203 were produced respectively.

These liquid crystal displays were evaluated in terms of color tone fluctuation and front contrast. Results are shown in Table 9.

(Evaluation of Color Tone Fluctuation)

The color tone fluctuation was measured by the use of a measuring device (EZ-Contrast 160D manufactured by ELDIM) for each of the liquid crystal displays produced as mentioned above as follows. On the condition where a screen was made a black display mode, the screen was observed around 360° directions from the direction slanted an angle by 60° from the normal line direction on the display device in CIE1976 UCS coordinate, and the maximum color tone fluctuation range (delta u'v') was compared among the observed data.

(Evaluation of Front Contrast)

In the environment of 23° C. 55% RH, after the backlight of each of the liquid crystal displays was continuously lighted for one week, the measurement was performed. EZ-Contrast 160D manufactured by ELDIM was used for the measurement in such a way that the luminance from the normal line direction of the display screen was measured on a white display mode and a black display mode of the liquid crystal display, and the ratio between the luminance values on the white display mode and the black display mode was made as the front contrast.

Front contrast=(luminance on the white display mode measured from the normal line direction of the display device)/(luminance on the black display mode measured from the normal line direction of the display device)

TABLE 9

| Polarizing plate | Light leakage amount | liquid crystal display device No. | Color tone fluctuation ($\Delta u'v'$) | Front contrast | Remarks |
|---|---|---|---|---|---|
| 301 | 0.2 | 301 | 0.06 | 1170 | Invention |
| 302 | 0.3 | 302 | 0.08 | 1150 | Invention |
| 303 | 0.7 | 303 | 0.07 | 1120 | Invention |
| 304 | 0.9 | 304 | 0.08 | 1120 | Invention |
| 305 | 0.2 | 305 | 0.07 | 1130 | Invention |
| 306 | 0.2 | 306 | 0.05 | 1170 | Invention |
| 307 | 0.2 | 307 | 0.05 | 1140 | Invention |
| 308 | 0.3 | 308 | 0.06 | 1120 | Invention |
| 309 | 0.3 | 309 | 0.06 | 1110 | Invention |
| 310 | 0.3 | 310 | 0.06 | 1150 | Invention |
| 311 | 0.2 | 311 | 0.06 | 1150 | Invention |
| 312 | 0.3 | 312 | 0.06 | 1150 | Invention |
| 313 | 0.4 | 313 | 0.07 | 1150 | Invention |
| 314 | 0.4 | 314 | 0.08 | 1150 | Invention |
| 315 | 0.2 | 315 | 0.07 | 1100 | Invention |
| 316 | 0.7 | 316 | 0.07 | 1170 | Invention |
| 317 | 0.5 | 317 | 0.06 | 1150 | Invention |
| 318 | 0.5 | 318 | 0.06 | 1150 | Invention |
| 319 | 0.4 | 319 | 0.08 | 1140 | Invention |
| 320 | 0.5 | 320 | 0.07 | 1150 | Invention |
| 321 | 0.4 | 321 | 0.08 | 1130 | Invention |
| 322 | 0.6 | 322 | 0.07 | 1140 | Invention |
| 323 | 0.3 | 323 | 0.07 | 1150 | Invention |
| 324 | 0.5 | 324 | 0.08 | 1160 | Invention |
| 325 | 0.4 | 325 | 0.07 | 1170 | Invention |
| 326 | 0.5 | 326 | 0.07 | 1150 | Invention |
| 327 | 0.5 | 327 | 0.07 | 1130 | Invention |
| 328 | 0.2 | 328 | 0.05 | 1140 | Invention |
| 329 | 0.4 | 329 | 0.06 | 1160 | Invention |
| 330 | 0.5 | 330 | 0.07 | 1150 | Invention |
| 331 | 0.4 | 331 | 0.08 | 1130 | Invention |
| 332 | 0.3 | 332 | 0.06 | 1120 | Invention |
| 333 | 0.7 | 333 | 0.08 | 1120 | Invention |
| 334 | 1.1 | 334 | 0.09 | 1070 | Invention |
| 401 | 4.8 | 401 | 0.17 | 900 | Comparative example |
| 402 | 4.5 | 401 | 0.15 | 950 | Comparative example |
| 403 | 4.0 | 402 | 0.18 | 980 | Comparative example |

It is clear from the results indicated in FIG. 9, the polarizing plates 101 to 134 are polarizing plates excellent in light leakage. Further, it is also clear that the liquid crystal displays 101 to 134 are liquid crystal displays excellent in color tone fluctuation and front contrast.

What is claimed is:

1. An optical compensation film, containing:
cellulose ester;
(meth)acrylic polymer in an amount of 3.0 to 11.5 parts by weight to 100 parts by weight cellulose ester; and
an esterified compound in which all or a part of OH groups in a compound (A) are esterified, wherein the compound (A) has one of a furanose structure and a pyranose structure; or
an esterified compound in which all or a part of OH groups in a compound (B) are esterified, wherein in the compound (B), two or more and twelve or less of at least one kind of a furanose structure and a pyranose structure are bonded,
wherein the optical compensation film is stretched so as to satisfy the following formulas (A-1) to (A-3), $$20 \leq Ro \leq 100 \text{ (nm)} \tag{A-1}$$

$$70 \leq Rt \leq 200 \text{ (nm)} \tag{A-2}$$

$$0.82 \leq Ro(480)/Ro(630) \leq 0.95, \tag{A-3}$$

here, $$Ro = (nx - ny) \times d$$

$$Rt = ((nx + ny)/2 - nz) \times d$$

in these formulas, nx represents a refractive index in a slow axis direction in a plane of the optical compensation film, ny represents a refractive index in a direction perpendicular to the slow axis in a plane, nz represents a refractive index in a thickness direction and d represents the thickness (nm) of the optical compensation film, and the measuring wavelength for the refractive index is 590 nm, and Ro (480) and Ro (630) represent Ro measured with the wavelength of 480 nm and Ro measured with the wavelength of 630 nm, respectively, and
wherein the stretched optical compensation film has a haze of 0.41 or less.

2. The optical compensation film described in claim 1 and characterized in that the esterified compound is a benzoate ester of a monosaccharide or a benzonate ester of a polysaccharide (m+n=2 to 12) produced by dehydration condensation of at least two positions of $-OR_{12}$, $-OR_{15}$, $-OR_{22}$, and $-OR_{25}$ of monosaccharides represented by the following Formula (A)

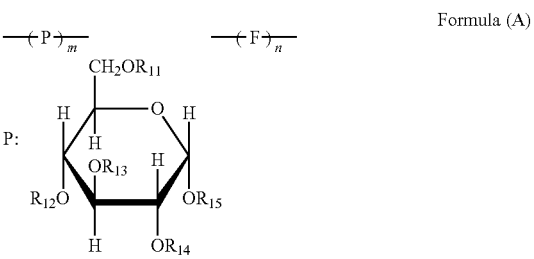

Formula (A)

-continued

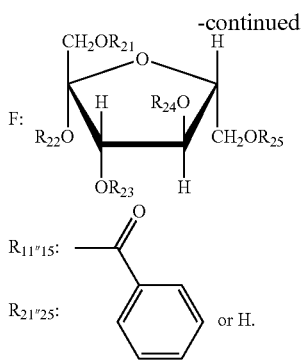

3. The optical compensation film described in claim 1 and characterized in that the (meth)acrylic polymer is a polymer Y which is obtained by a process of polymerizing ethylenic unsaturated monomer Ya not having an aromatic ring and has a weight average molecular weight of 500 or more and 3,000 or less.

4. The optical compensation film described claim 1 and characterized that the above mentioned (meth)acrylic polymer is:
a polymer X which is obtained by a process of copolymerizing an ethylenic unsaturated monomer Xa not having an aromatic ring and a hydroxyl group at least in a molecule thereof and an ethylenic unsaturated monomer Xb not having an aromatic ring and having a hydroxyl group in a molecule thereof and has a weight average molecular weight of 3,000 or more and 33,000 or less, and a polymer Y which is obtained by a process of polymerizing an ethylenic unsaturated monomer Ma not having an aromatic ring and has a weight average molecular weight of 500 or more and 3,000 or less.

5. The optical compensation film described in claim 4 and characterized in that the above-mentioned polymer X is represented by Formula (X) and the above-mentioned polymer Y is represented by Formula (Y);

—[CH$_2$—C(—R1)(-CO$_2$R2)]$m$-[CH$_2$—C(—R3)(-CO$_2$R4-OH)-]$n$-[Xc]$p$-     Formula (X)

R$_y$—[CH$_2$—C(—R5)(-CO$_2$R6-OH)]$k$-[Yb]$q$-     Formula (Y)

(in these formulas, R1, R3, and R5 represent H or CH$_3$ respectively, R2 is an alkyl group having a carbon number of 1 to 12 or a cycloalkyl group, R4 and R6 represent —CH$_2$—, —C$_2$H$_4$—, or —C$_3$H$_6$— respectively, Ry represents OH, H, or an alkyl group having a carbon number of 3 or less, Xc represents a monomer unit polymerizable with Xa and Xb, Yb represents a monomer unit copolymerizable with Ya, each of m, n, k, p, and q represents a mole composition ratio, provided that each of m and k is not 0 m+n+p=100, and k+q=100.

6. A polarizing plate, comprising:
the optical compensation film described in claim 1 on at least one surface thereof.

7. A liquid crystal display, comprising:
the polarizing plate described in claim 6 on at least one of a liquid crystal cell.

8. The optical compensation film described in claim 1, wherein the optical compensation film has a film thickness of 20 to 60 μm.

* * * * *